US011250427B2

(12) United States Patent
Chen et al.

(10) Patent No.: US 11,250,427 B2
(45) Date of Patent: Feb. 15, 2022

(54) CREDIT PAYMENT METHOD AND APPARATUS BASED ON MOBILE TERMINAL PEER-TO-PEER

(71) Applicant: Advanced New Technologies Co., Ltd., Grand Cayman (KY)

(72) Inventors: Xing Chen, Shanghai (CN); Lei Wang, Hangzhou (CN); Jie Lan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/722,252

(22) Filed: Dec. 20, 2019

(65) Prior Publication Data
US 2020/0143373 A1 May 7, 2020

Related U.S. Application Data

(63) Continuation of application No. 16/042,808, filed on Jul. 23, 2018, which is a continuation of application No. PCT/CN2017/071251, filed on Jan. 16, 2017.

(30) Foreign Application Priority Data

Jan. 25, 2016 (CN) .......................... 201610049675.4

(51) Int. Cl.
*G06Q 20/40* (2012.01)
*G06Q 20/38* (2012.01)
(Continued)

(52) U.S. Cl.
CPC ........... *G06Q 20/401* (2013.01); *G06Q 20/24* (2013.01); *G06Q 20/3278* (2013.01);
(Continued)

(58) Field of Classification Search
None
See application file for complete search history.

(56) References Cited

U.S. PATENT DOCUMENTS 6,463,534 B1 10/2002 Geiger et al.
7,945,670 B2 5/2011 Nakamura et al.
(Continued)

FOREIGN PATENT DOCUMENTS

CN 101364329 2/2009
CN 101778381 7/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Jamie R Kucab
*Assistant Examiner* — Nicholas K Phan
(74) *Attorney, Agent, or Firm* — Fish & Richardson P.C.

(57) ABSTRACT

Technologies related to mobile credit payment are disclosed. In an implementation, a first SNEP Get Request Message is generated and sent to a mobile computing device, in response to a NFC signal received from the mobile computing device. A first SNEP Response Message is received from the mobile computing device and parsed to identify an APP public key license. A pre-stored credit authorization public key is used to verify the APP public key license and an APP public key is retrieved from the APP public key license if the verification is successful. A second SNEP Get Request Message is sent to the mobile computing device and a second SNEP Response Message is received from the mobile computing device. The APP public key is then used to decrypt the second SNEP Response Message, and a
(Continued)

transaction log is recorded if the second SNEP Response Message is successfully decrypted.

20 Claims, 31 Drawing Sheets

(51) Int. Cl.
    *G06Q 20/24*     (2012.01)
    *G06Q 20/32*     (2012.01)
    *G06Q 20/34*     (2012.01)

(52) U.S. Cl.
    CPC .......... *G06Q 20/34* (2013.01); *G06Q 20/385* (2013.01); *G06Q 20/3829* (2013.01); *G06Q 20/38215* (2013.01)

(56) References Cited

U.S. PATENT DOCUMENTS

| | | | |
|---|---|---|---|
| 9,881,294 | B2 | 1/2018 | Bishop et al. |
| 2008/0183565 | A1 | 7/2008 | Dixon et al. |
| 2009/0132813 | A1 | 5/2009 | Schibuk |
| 2010/0057579 | A1* | 3/2010 | Tan ................... G06Q 20/105 705/17 |
| 2011/0087598 | A1* | 4/2011 | Bozeman .............. G06Q 20/04 705/45 |
| 2012/0159163 | A1 | 6/2012 | von Behren et al. |
| 2012/0193434 | A1 | 8/2012 | Grigg et al. |
| 2012/0197787 | A1 | 8/2012 | Grigg et al. |
| 2013/0080276 | A1* | 3/2013 | Granbery .............. G06Q 20/20 705/21 |
| 2013/0346319 | A1 | 12/2013 | Tan |
| 2014/0180826 | A1 | 6/2014 | Boal |
| 2014/0277783 | A1 | 9/2014 | Knuth et al. |
| 2015/0006386 | A1 | 1/2015 | Tebbe |
| 2015/0019443 | A1 | 1/2015 | Sheets et al. |
| 2015/0073996 | A1 | 3/2015 | Makhotin et al. |
| 2015/0262170 | A1 | 9/2015 | Bouda |
| 2015/0278796 | A1 | 10/2015 | Jiang et al. |
| 2015/0363764 | A1 | 12/2015 | Grigg et al. |
| 2016/0071100 | A1* | 3/2016 | Noe .................... G06Q 20/027 705/76 |
| 2016/0085955 | A1* | 3/2016 | Lerner .................. G06F 21/31 726/20 |
| 2016/0217467 | A1 | 7/2016 | Smets et al. |
| 2016/0267458 | A1* | 9/2016 | Metral ............... G06Q 20/3278 |
| 2016/0283933 | A1 | 9/2016 | Orlando et al. |
| 2016/0308858 | A1 | 10/2016 | Nordstrom et al. |
| 2017/0109726 | A1* | 4/2017 | Chen ................. G06Q 20/3227 |
| 2017/0147588 | A1* | 5/2017 | Mailer .................. G06F 16/125 |
| 2017/0161843 | A1 | 6/2017 | Rizzini |
| 2017/0186057 | A1* | 6/2017 | Metnick ............ G06Q 20/3274 |
| 2017/0270732 | A1 | 9/2017 | Troesch et al. |
| 2018/0330360 | A1 | 11/2018 | Chen |
| 2018/0349901 | A1 | 12/2018 | Chen et al. |
| 2020/0126061 | A1 | 4/2020 | Chen |

FOREIGN PATENT DOCUMENTS

| | | |
|---|---|---|
| CN | 101809633 | 8/2010 |
| CN | 102081821 | 6/2011 |
| CN | 202077102 | 12/2011 |
| CN | 102468960 | 5/2012 |
| CN | 102630083 | 8/2012 |
| CN | 102902553 | 1/2013 |
| CN | 103136668 | 6/2013 |
| CN | 103188238 | 7/2013 |
| CN | 103500400 | 1/2014 |
| CN | 103617532 | 3/2014 |
| CN | 103812835 | 5/2014 |
| CN | 104602224 | 5/2015 |
| CN | 105096113 | 11/2015 |
| EP | 2278539 | 1/2011 |
| JP | 2003044765 | 2/2003 |
| JP | 2004005410 | 1/2004 |
| JP | 2006108767 | 4/2006 |
| JP | 2010541036 | 12/2010 |
| JP | 2013546108 | 12/2013 |
| JP | 2014230004 | 12/2014 |
| KR | 20010025193 | 4/2001 |
| KR | 20010033972 | 4/2001 |
| KR | 20040084346 | 10/2004 |
| KR | 100845281 | 7/2008 |
| KR | 20150069237 | 6/2015 |
| TW | 200526056 | 8/2005 |
| TW | 201303780 | 1/2013 |
| TW | 201424441 | 6/2014 |
| TW | 201429173 | 7/2014 |
| TW | I460664 | 11/2014 |
| TW | 201523476 | 6/2015 |
| TW | 201539339 | 10/2015 |
| WO | WO 2014048990 | 4/2014 |
| WO | WO 2015148850 | 10/2015 |

OTHER PUBLICATIONS

Extended European Search Report in European Application No. 17743590.6, dated Sep. 16, 2019, 9 pages.
International Search Report issued by the International Searching Authority in International Application No. PCT/CN2017/071251 dated Apr. 21, 2017; 9 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/071251, dated Jul. 31, 2018, 9 pages (with English translation).
PCT International Written Opinion of the International Searching Authority in International Application No. PCT/CN2017/071251, dated Apr. 21, 2017, 8 pages (with English translation).
Extended European Search Report in European Application No. 17743591.4, dated Aug. 14, 2019, 8 pages.
International Preliminary Report on Patentability in International Application No. PCT/CN2017/071254 dated Jul. 31, 2018; 10 pages.
International Search Report issued by the International Searching Authority in International Application No. PCT/CN2017/071254 dated Apr. 19, 2017; 9 pages.
U.S. Appl. No. 16/042,808, filed Jul. 23, 2018, Xing Chen.
U.S. Appl. No. 16/043,417, filed Jul. 24, 2018, Xing Chen.
U.S. Appl. No. 16/719,348, filed Dec. 18, 2019, Xing Chen.
Kuhn et al., "Introduction to Public Key Technology and the Federal PKI Infrastructure," National Institute of Standards and Technology, Feb. 2001, Document SP 800-32, pp. 1-54.

* cited by examiner

CREDIT PAYMENT METHOD AND APPARATUS BASED ON MOBILE TERMINAL PEER-TO-PEER

This application is a continuation of U.S. application Ser. No. 16/042,808, filed on Jul. 23, 2018, which is a continuation of PCT Application No. PCT/CN2017/071251, filed on Jan. 16, 2017, which claims priority to Chinese Patent Application No. 201610049675.4, filed on Jan. 25, 2016, and each application is hereby incorporated by reference in its entirety.

TECHNICAL FIELD

The present disclosure relates to the field of communications technologies, and in particular, to a credit payment method and apparatus based on mobile terminal peer-to-peer (P2P).

BACKGROUND

Currently, public transportation mainly includes ground transportation and subway. When users purchase public transportation tickets, they normally use cash or pre-paid cards. Cash payment is mainly used for the public transportation system, and the user can buy a ticket by inserting coins. Users can alternatively get pre-paid metro cards, and take a bus or subway by scanning the card.

When a user purchases a bus ticket in cash, because many buses are self-serving and provide no exchange, the user needs to prepare the exact amount of fares in advance, which can be inconvenient to the user. Moreover, after close of business, bus system staff needs to count all the small fares that are put in by the self-service bus users, bringing extra work to the staff. When a user uses a metro card to take the public transportation, because most current bus cards are non-contact radio frequency (RF) cards, user-caused damages and wears, such as bending the card, or abrasion of the card's surface, are easily made to the metro card during its normal use. When a user uses a single-ride card to take public transportation, the user normally buys single-ride cards in small fares, and the staff also needs to count the small fares.

When a user uses a reusable pre-paid card to take public transportation, because the pre-paid card is unregistered and its loss cannot be reported, a loss can be caused to the user after the reusable prepaid bus card is lost. The user also needs to purchase, recharge, and get a refund for the prepaid card at specified locations, which makes it inconvenient to the user.

SUMMARY

To overcome the problem in the related technologies, the present disclosure provides a credit payment method and apparatus based on mobile terminal peer-to-peer (P2P).

According to a first aspect of implementations of the present disclosure, a credit payment method based on mobile terminal P2P is provided, and is applied to a mobile terminal, and the method includes: receiving transaction information sent by a transaction terminal; generating transaction response information based on the transaction information, and sending the transaction response information to the transaction terminal; receiving deduction accept request information of the current payment transaction that is sent by the transaction terminal; generating an application-private-key-generated payment license in the mobile terminal based on the deduction accept request information and the transaction response information; and sending the payment license to the transaction terminal, so that the transaction terminal completes the current payment transaction based on the received payment license.

After sending transaction information to a transaction terminal, the transaction response information that corresponds to the transaction information, the method further includes: receiving application public key certificate return request information sent by the transaction terminal; and generating application public key certificate response information for an application public key certificate in the mobile terminal based on the application public key certificate return request information, and sending the application public key certificate response information to the transaction terminal.

Further, generating an application-private-key-generated payment license in the mobile terminal includes: generating signature data based on the deduction accept request information by using an application private key stored in the mobile terminal; generating a transaction authentication code (TAC) based on the deduction accept request information and the transaction response information by using a TAC sub-key pre-generated in the mobile terminal; and using the signature data and the TAC as the payment license.

Further, the payment method is applied to public transportation payment; and the transaction response information includes a payment card number, an available limit, and an entry/exit flag.

Further, the deduction accept request information includes a deduction amount, a date of the current payment transaction, a time of the current payment transaction, an entry/exit flag of the current payment transaction, and station information of the current payment transaction.

Further, the method includes: subtracting the deduction amount from the available limit in the transaction response information based on the deduction amount in the deduction accept request information, to obtain a current available limit; and using the current available limit as an available limit of a user that corresponds to the mobile terminal.

According to a second aspect of the implementations of the present disclosure, a credit payment method based on mobile terminal P2P is provided, and the method includes: sending transaction information to a mobile terminal; receiving transaction response information sent by the mobile terminal; generating deduction accept request information of the current payment transaction based on the transaction response information; sending the deduction accept request information to the mobile terminal; and when receiving a payment license, determining, based on the payment license, that the current payment transaction can be completed.

After the receiving transaction response information sent by the mobile terminal, the method further includes: sending application public key certificate return request information to the mobile terminal; receiving application public key certificate response information sent by the mobile terminal; verifying a signature on an application public key certificate in the application public key certificate response information by using a credit-licensed public key in the transaction terminal; and when an application public key is restored from the application public key certificate during the signature verification process, performing the step of generating deduction accept request information of the current payment transaction.

Further, the payment method is applied to public transportation payment; and the transaction response information includes a payment card number, an available limit, an entry/exit flag, and information about a last transaction.

Further, the method includes: determining whether the payment card number in the transaction response information is included in a predetermined blacklist; and when the payment card number in the transaction response information is not included in the predetermined blacklist, performing the step of sending application public key certificate return request information to the mobile terminal.

Further, the method includes: determining whether the available limit in the transaction response information is greater than or equal to a predetermined threshold; if the available limit is greater than or equal to the predetermined threshold, checking whether the entry/exit flag in the transaction response information is an exited state; and when the entry/exit flag is an exited state, performing the step of sending application public key certificate return request information to the mobile terminal.

Further, the payment license includes signature data and a TAC, and the determining, based on the payment license, that the current payment transaction can be completed includes: verifying the signature data by using the application public key; generating a transaction log when the signature data is verified; and sending the transaction log to a predetermined server, so that the predetermined server deducts, based on the transaction log, a corresponding amount of fund from a user account that corresponds to the mobile terminal, where the transaction log includes the deduction amount, a transaction date, a transaction moment, a transaction terminal ID, a payment card number, an available limit, and the TAC.

According to a third aspect of the implementations of the present disclosure, a credit payment apparatus based on mobile terminal P2P is provided, and the apparatus includes: a first return request information receiving unit, configured to: when a transaction terminal is detected, receive transaction information sent by the transaction terminal; a transaction response information generation unit, configured to generate transaction response information based on the transaction information; an information sending unit, configured to send the transaction response information to the transaction terminal; a deduction accept request information receiving unit, configured to receive deduction accept request information of the current payment transaction that is sent by the transaction terminal; an application-private-key-generated payment license generation unit, configured to generate an application-private-key-generated payment license in the mobile terminal based on the deduction accept request information and the transaction response information; and a payment license sending unit, configured to send the payment license to the transaction terminal, so that the transaction terminal completes the current payment transaction based on the received payment license.

The apparatus further includes: a second return request information receiving unit, configured to receive application public key certificate return request information sent by the transaction terminal; an application public key certificate response information generation unit, configured to generate application public key certificate response information for an application public key certificate in the mobile terminal based on the application public key certificate return request information; and a public key certificate response information sending unit, configured to send the application public key certificate response information to the transaction terminal.

Further, the application-private-key-generated payment license generation unit includes: a signature data generation module, configured to generate signature data based on the deduction accept request information by using an application private key stored in the mobile terminal; an information generation module, configured to generate a TAC based on the deduction accept request information and the transaction response information by using a TAC sub-key pre-generated in the mobile terminal; and a payment license determining module, configured to use the signature data and the TAC as the payment license.

Further, the transaction response information includes a payment card number, an available limit, an entry/exit flag, and information about a last transaction.

Further, when the payment apparatus is applied to public transportation payment, the deduction accept request information includes a deduction amount, a date of the current payment transaction, a time of the current payment transaction, an entry/exit flag of the current payment transaction, and station information of the current payment transaction.

Further, the apparatus includes: a current available limit generation unit, configured to subtract the deduction amount from the available limit in the transaction response information based on the deduction amount in the deduction accept request information, to obtain a current available limit; and an available limit determining unit, configured to use the current available limit as an available limit of a user that corresponds to the mobile terminal.

According to a fourth aspect of the implementations of the present disclosure, a credit payment apparatus based on mobile terminal P2P is provided, and the apparatus is applied to a transaction terminal and includes: a transaction information sending unit, configured to send transaction information to a mobile terminal; a transaction response information receiving unit, configured to receive transaction response information sent by the mobile terminal; a deduction unit, configured to generate deduction accept request information of the current payment transaction based on the transaction response information; a deduction accept request information sending unit, configured to send the deduction accept request information to the mobile terminal; and a current-payment-transaction complete unit, configured to: when a payment license is received, determine, based on the payment license, that the current payment transaction can be completed.

The apparatus further includes: a return request information sending unit, configured to send application public key certificate return request information to the mobile terminal; a public key certificate response information receiving unit, configured to receive application public key certificate response information sent by the mobile terminal; and a signature verification unit, configured to verify a signature on an application public key certificate in the application public key certificate response information by using a credit-licensed public key in the transaction terminal.

Further, the transaction response information includes a payment card number, an available limit, and an entry/exit flag.

Further, the apparatus includes: a blacklist determining unit, configured to determine whether the payment card number in the transaction response information is included in a predetermined blacklist; and the return request information sending unit is further configured to: when the payment card number in the transaction response information is not included in the predetermined blacklist, send the application public key certificate return request information to the mobile terminal.

Further, the apparatus includes: a threshold determining unit, configured to determine whether the available limit in the transaction response information is greater than or equal to a predetermined threshold; and a status checking unit, configured to: if the available limit is greater than or equal to the predetermined threshold, check whether the entry/exit flag in the transaction response information is an exited state.

Further, the payment license includes signature data and a TAC, and the current-payment-transaction complete unit includes: a signature verification module, configured to verify the signature data by using the application public key; a transaction log generation module, configured to generate a transaction log when the signature data is verified; and a transaction log sending module, configured to send the transaction log to a predetermined server, so that the predetermined server deducts, based on the transaction log, a corresponding amount of fund from a user account that corresponds to the mobile terminal, where the transaction log includes the deduction amount, a transaction date, a transaction moment, a transaction terminal ID, a payment card number, an available limit, and the TAC.

The technical solutions provided in the implementations of the present disclosure can include the following beneficial effects:

The credit payment method and apparatus based on mobile terminal P2P that are provided in the present disclosure are applicable to the mobile terminal and the transaction terminal. After enabling a payment application, a user can complete offline credit payment with a transaction terminal by using a mobile terminal, so that a payment transaction can be fast and securely completed, and online payment is not needed. Therefore, the following situation is avoided: in the related technology, for example, when a user takes a public transport vehicle, the user can implement a payment transaction function only by using cash or a bus card.

It should be understood that the previous general descriptions and the following detailed descriptions are merely examples and explanations, and cannot limit the present disclosure.

BRIEF DESCRIPTION OF DRAWINGS

The accompanying drawings here are incorporated in the specification, become a part of the specification, show implementations that are in accordance with the present disclosure, and are used with the specification to explain a principle of the present disclosure.

DESCRIPTION OF IMPLEMENTATIONS

Example implementations are described in detail here, and examples of the implementations are presented in the accompanying drawings. When the following description relates to the accompanying drawings, the same numbers in different accompanying drawings represent the same element or similar elements unless specified otherwise. Implementations described in the following example implementations do not represent all implementations consistent with the present disclosure. Instead, they are examples of apparatus and methods that are described in the appended claims in detail and that are consistent with some aspects of the present disclosure.

Mobile payment is also referred to as mobile phone payment. A user can use a mobile terminal to pay for a purchased product or service. The mobile terminal can communicate with a transaction terminal through Near Field Communication (NFC), to complete a payment transaction. NFC, also referred to as short-distance communication, is a short distance high-frequency wireless frequency radio communication technology that allows electronic devices to exchange data through non-contact point-to-point data transmission. The secure nature of NFC technology shows good application prospect in fields such as payment.

P2P, namely, peer to peer, is one of three working modes of the NFC technology. Similar to infrared, the P2P mode can be used to exchange data. However, in the P2P mode, the transmission distance is shorter and both the transmission creation speed and the transmission speed are faster, and power consumption is lower than the infrared mode (similar to Bluetooth). Two devices with an NFC function can be wirelessly linked to each other to implement peer-to-peer data transmission; for example, music download, picture exchange, or device address book synchronization. Therefore, through NFC, data or a service can be exchanged among a plurality of devices such as a digital camera, a PDA, a computer, and a mobile phone. In the implementations of the present disclosure, the mobile terminal exchanges data with a bus gate in the P2P way of the NFC technology, to complete a credit payment transaction.

To facilitate better understanding and implementation of the present disclosure by a person skilled in the art, a correlation among a mobile terminal, a transaction terminal, and a server involved in the implementations of the present disclosure is first described briefly, such as how to transmit and process data between the terminals. Due to the wide application of the present disclosure, such as mobile payment, for better description, the present disclosure is illustrated by a scenario where customers use mobile phone credit payment to purchase public transportation fares.

Figure 1:
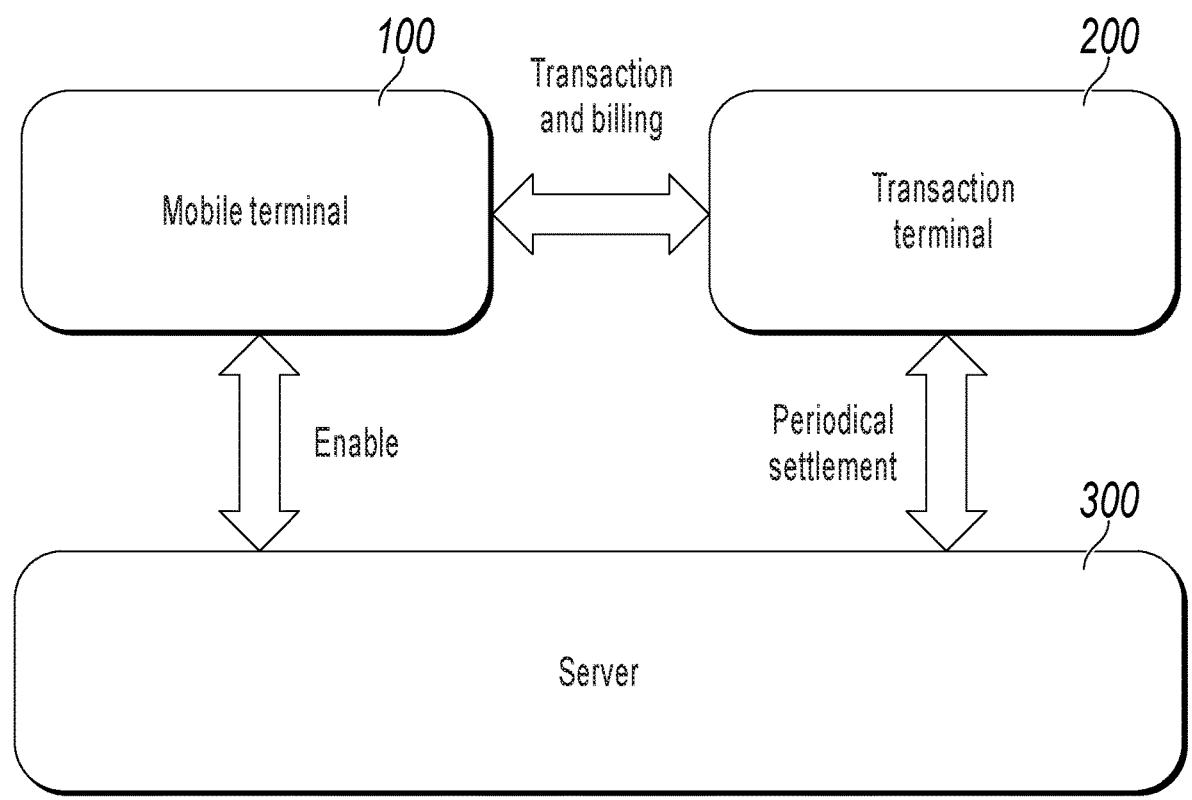
FIG. 1 is a schematic diagram illustrating a credit authorization system, according to an example implementation.

As shown in FIG. 1, a credit authorization system provided in an implementation of the present disclosure includes a mobile terminal 100, a transaction terminal 200, and a server 300. The mobile terminal 100 can be a mobile phone with a payment transaction function. The transaction terminal 200 can be a bus gate, and the bus gate is a POS terminal used in a bus system or a subway system. The server 300 is serving in a credit authorization system. Before making a payment transaction with the transaction terminal 200 by using the mobile terminal 100, a user needs to first enable a credit payment transaction function of the mobile terminal 100 by using the server 300, then can make the payment transaction with the transaction terminal 200 by using the mobile terminal 100. In addition, the transaction terminal 200 periodically uploads a transaction log of the mobile terminal 100 to the server 300, and the server 300 deducts a corresponding amount of funds from an account that corresponds to the mobile terminal 100, and pays the amount to the bus company.

In this implementation provided in the present disclosure, two applications can be installed on the mobile terminal. One is a credit payment application, for example, a credit payment application applet. For a Java card, Sun Microsystems Inc. sets Applet as the object for running on the Java card. The other application on the mobile terminal can be a credit authorization system application. Functions of the previous two applications on the mobile terminal can be implemented by using one application. It is not limited in the present implementation.

The transaction terminal 200 uses a strict identity security authentication mechanism, to ensure that only a user who passes identity security authentication and has an enough credit limit can enable a bus credit payment application.

The credit payment application applet is installed on the mobile terminal 100 with an NFC function. An application private-public key pair is generated during personalization. An application private key is stored in the credit payment application, and the credit payment application ensures that data of the application private key cannot be stolen in any condition. An application public key is signed as an application public key certificate by using a private key in the credit authorization system, and is saved in the credit payment application. A public key in the credit authorization system is provided for the transaction terminal 200, and a storage location is determined by the transaction terminal 200. Since it is a public key, no requirement is imposed on security.

When providing a credit payment transaction, after reading the application public key certificate in the credit payment application, the transaction terminal 200 verifies the application public key certificate by using the public key in the credit authorization system, to restore the application public key. The credit payment application generates a payment authorization license by using the application private key. The transaction terminal 200 verifies the payment authorization license by using the application public key, and then checks a security factor in the authorization license after the verification passes. After confirming security, the transaction terminal 200 performs credit accounting, and then settles a corresponding credit account at a specified time. To ensure payment security, when a quantity of use times, a limit, or an interval time exceeds a specified threshold, the mobile terminal needs to be connected to a network to verify user identity information, and grant authorization again.

Figure 2:
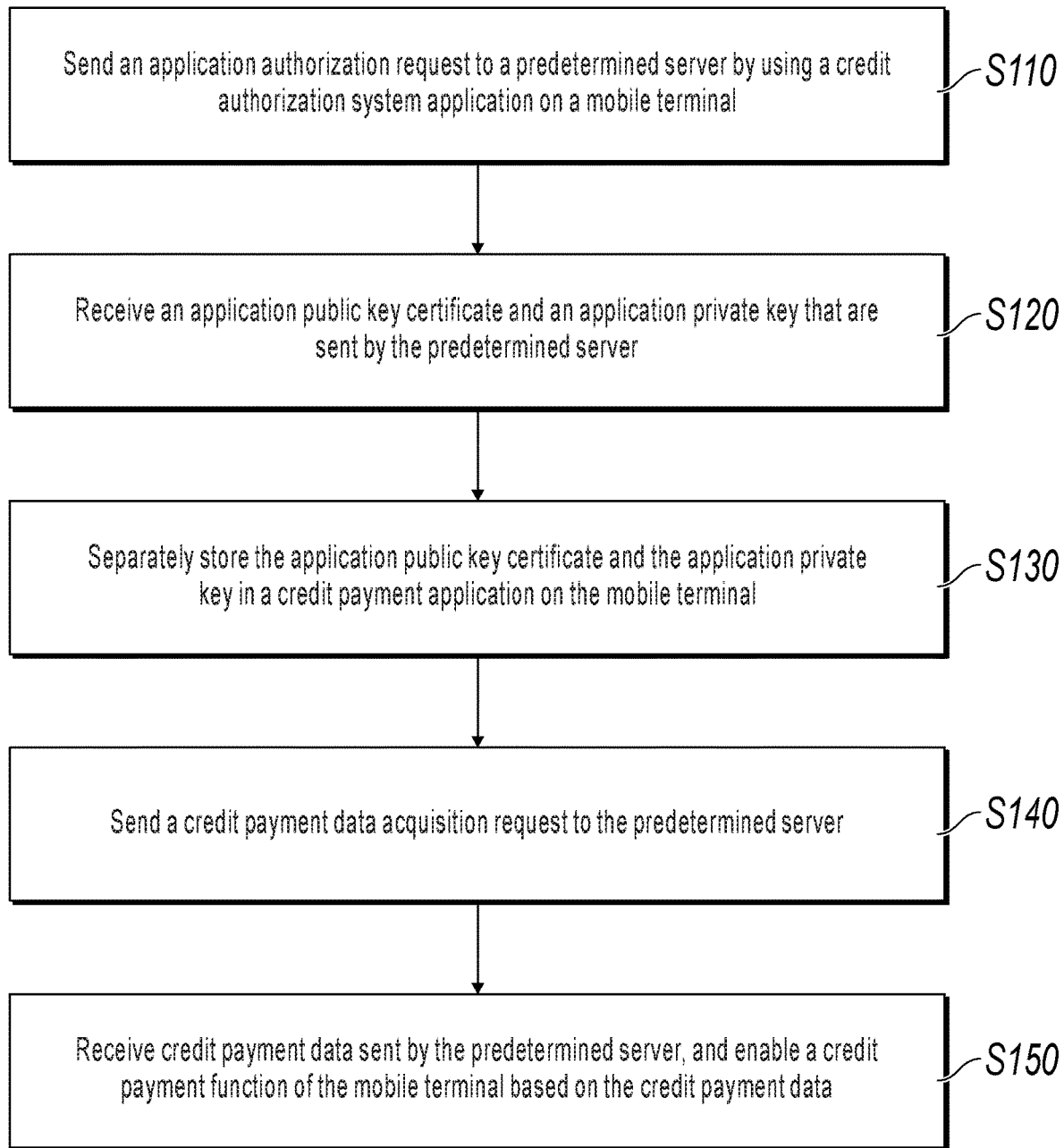
FIG. 2 is a flowchart illustrating a credit payment method based on mobile terminal P2P, according to an example implementation.

To resolve a related technical problem, an implementation of the present disclosure provides a credit payment method based on mobile terminal P2P, applied to a process that enables credit payment by a mobile terminal. As shown in FIG. 2, the method can include the following steps.

In step S110, send an application authorization request to a predetermined server by using a credit authorization system application on the mobile terminal.

The credit authorization system application is installed on the mobile terminal, and the mobile terminal can send the application authorization request to a server of a credit authorization system by using the authorization system application.

In step S120, receive an application public key certificate and an application private key that are sent by the predetermined server.

Based on the received application authorization request, the server of the credit authorization system generates a pair of keys, that is, the application public key and the application private key. The server signs the application public key by using an authorized private key locally stored on the sever, to generate an application public key certificate, and sends the obtained application public key certificate and the application private key to the mobile terminal.

In step S130, store the application public key certificate and the application private key in a credit payment application on the mobile terminal.

The mobile terminal stores, in the credit payment application on the mobile terminal, the application public key certificate and the application private key that are sent by the serving end.

In step S140, a credit payment data acquisition request is sent to the predetermined server.

In step S150, credit payment data sent by the predetermined server is received, and a credit payment function of the mobile terminal is enabled based on the credit payment data.

Credit payment data can be a personalization script, and the personalization script includes a payment card number, a credit limit, an available limit, and a TAC sub-key. The payment card number is a unique character code generated by the credit authorization system for a credit payment application of each user. The available limit is an amount of fund that the user can use currently. The TAC sub-key is obtained by the server in the credit authorization system based on the card number hash by using a TAC parent private key.

Figure 3:
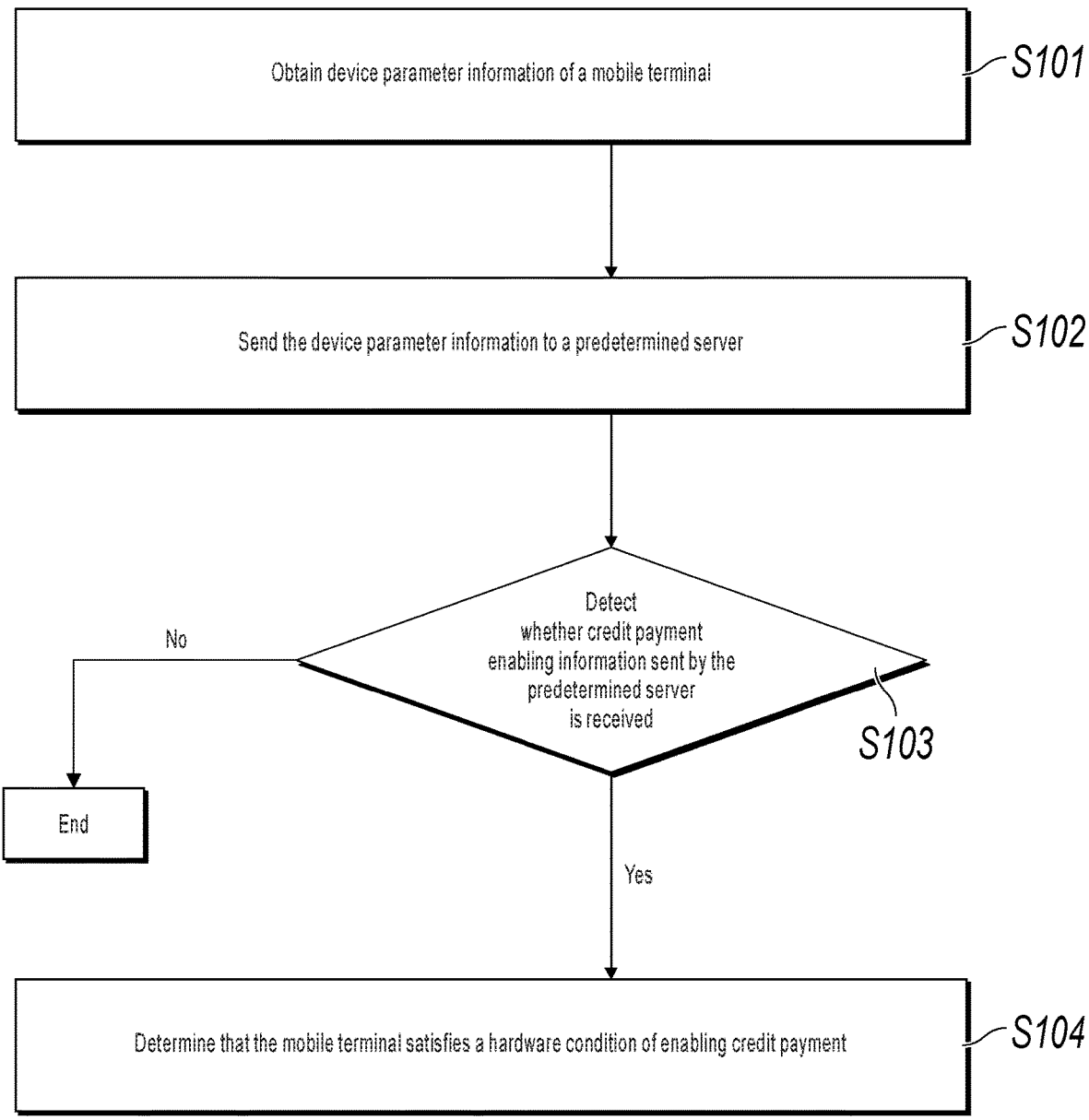
FIG. 3 is a flowchart illustrating a credit payment method based on mobile terminal P2P, according to another example implementation.

In another implementation provided in the present disclosure, based on FIG. 2, as shown in FIG. 3, before step S110, the method can further include the following steps.

In step S101, obtain device parameter information of the mobile terminal.

The device parameter information of the mobile terminal can be hardware information of the mobile terminal. It needs to be checked first, based on the device parameter information, whether the mobile terminal satisfies a hardware condition of a payment transaction, for example, whether the mobile terminal has an NFC function. Certainly, the device parameter information can also be information such as device model, a ROM version, a system model (such as, Android), an application version, etc. of the mobile terminal.

In step S102, send the device parameter information to the predetermined server.

The mobile terminal sends the obtained device parameter information of the mobile terminal to the server of the credit authorization system, so that the server determines, based on the received device parameter information, whether the mobile terminal meet a hardware condition for enabling credit payment.

In step S103, check whether credit payment enabling information sent by the predetermined server is received.

If the mobile terminal meets the hardware condition for enabling credit payment, the server sends the credit payment enabling information to the mobile terminal. The credit payment enabling information can be a credit payment application enabling page.

If the mobile terminal does not meet the hardware condition for enabling credit payment, the server does not send the credit payment enabling information to the mobile terminal.

When the credit payment enabling information sent by the predetermined server is received, step S104 is performed.

In step S104, determine that the mobile terminal meets the hardware condition for enabling credit payment, and step S110 is performed.

Figure 4:
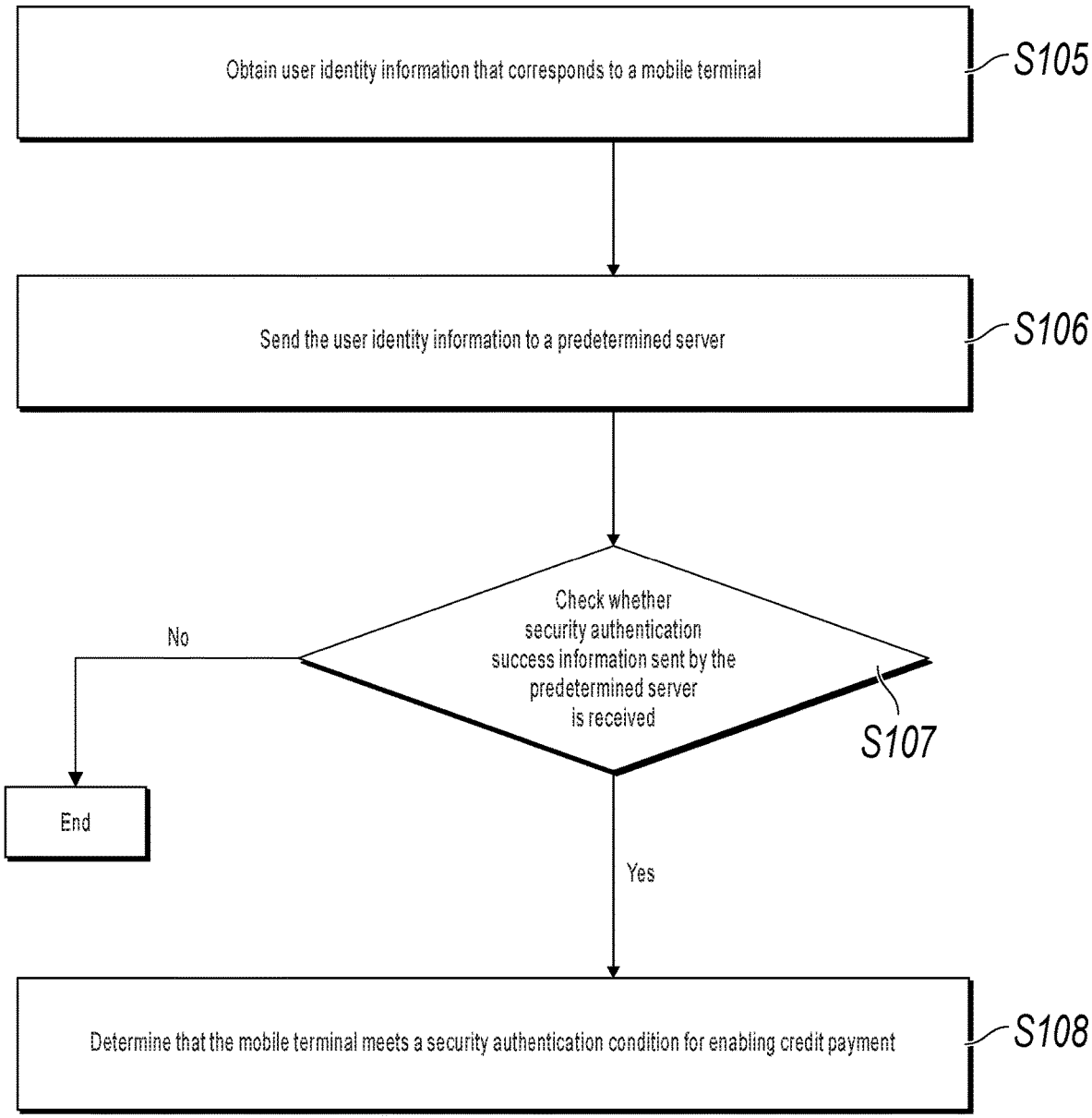
FIG. 4 is a flowchart illustrating a credit payment method based on mobile terminal P2P, according to yet another example implementation.

In addition to checking whether the mobile terminal meets the hardware condition for enabling credit payment, based on FIG. 2, before step S110, as shown in FIG. 4, whether the mobile terminal meets a security authentication condition further needs to be checked. Therefore, in another implementation provided in the present disclosure, the credit payment method based on mobile terminal P2P provided in the present disclosure can further include the following steps.

In step S105, obtain user identity information that corresponds to the mobile terminal.

The user identity information can be information such as an ID card number, a name, a bank card number, an email address, an Alipay account, etc. of the user.

In step S106, send the user identity information to the predetermined server, so that the predetermined server determines, based on the received user identity information, whether the mobile terminal meets a security authentication condition for enabling credit payment.

The mobile terminal sends the user identity information to the server in the credit authorization system, so that the server verifies the user identity information, for example, verifies whether the bank card number provides service normally, or whether a user account has a bad-credit transaction record.

In step S107, check whether security authentication success information sent by the predetermined server is received.

After receiving the user information sent by the mobile terminal, the server checks the user information. If the mobile terminal meets the security authentication condition for enabling credit payment, the server sends the security authentication success information to the mobile terminal.

When the security authentication success information sent by the predetermined server is received, step S108 is performed. In step S108, determine that the mobile terminal meets the security authentication condition for enabling credit payment, and step S110 is performed.

When the mobile terminal receives the security authentication success information sent by the server end, the mobile terminal determines that the mobile terminal meets the security authentication condition for enabling credit payment.

When the mobile terminal does not receive security authentication success information sent by the server end, the mobile terminal determines that the mobile terminal does not meet the security authentication condition for enabling credit payment.

Figure 5:
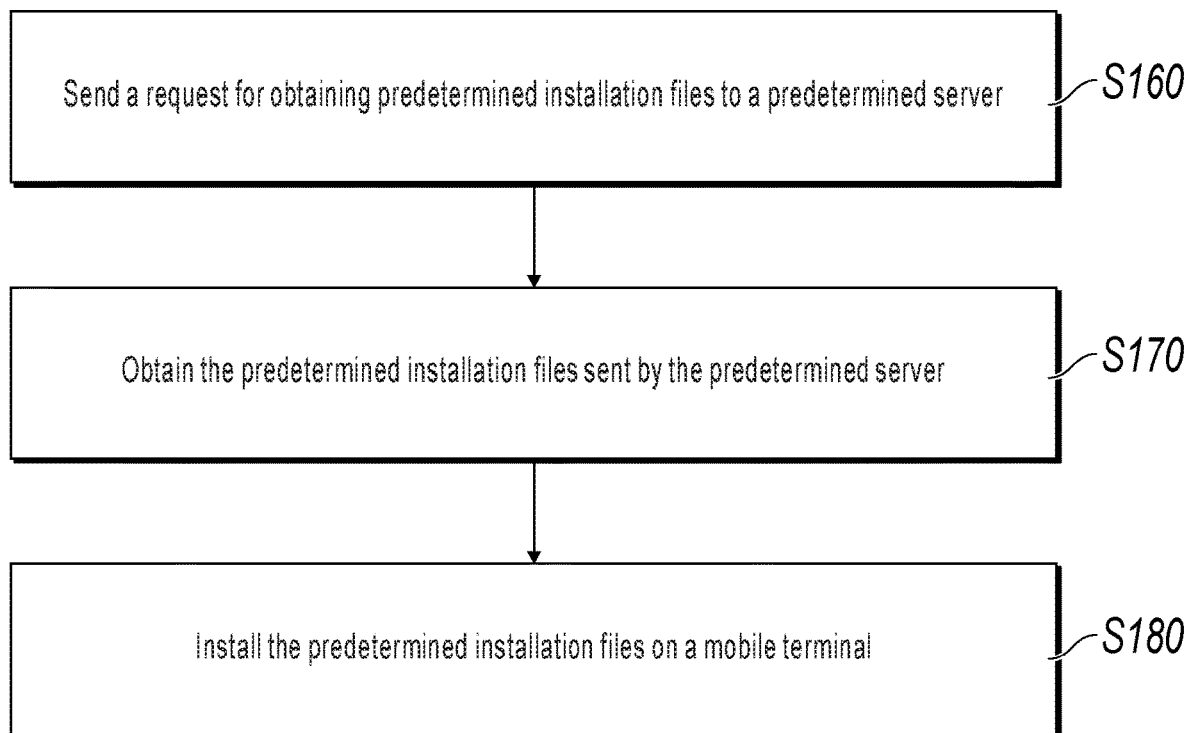
FIG. 5 is a flowchart illustrating a credit payment method based on mobile terminal P2P, according to yet another example implementation.

Based on FIG. 2, before step S110, as shown in FIG. 5, a related application further needs to be installed on the mobile terminal. Therefore, the credit payment method based on a mobile terminal P2P provided in the present disclosure further includes the following steps.

In step S160, send a request for obtaining predetermined installation files to the predetermined server.

The predetermined installation files includes a credit payment application.

In step S170, obtain the predetermined installation files sent by the predetermined server.

In step S180, install the predetermined installation files on the mobile terminal, step S110 is performed.

After the credit payment application and a registration script are separately installed on the mobile terminal, user personalization of the mobile terminal is completed. As such, the procedure of enabling the credit payment function on a mobile terminal is completed. Based on the previous implementations, an execution procedure on a server side of the credit authorization system in which the mobile terminal enables the credit payment function is described in detail below.

Figure 6:
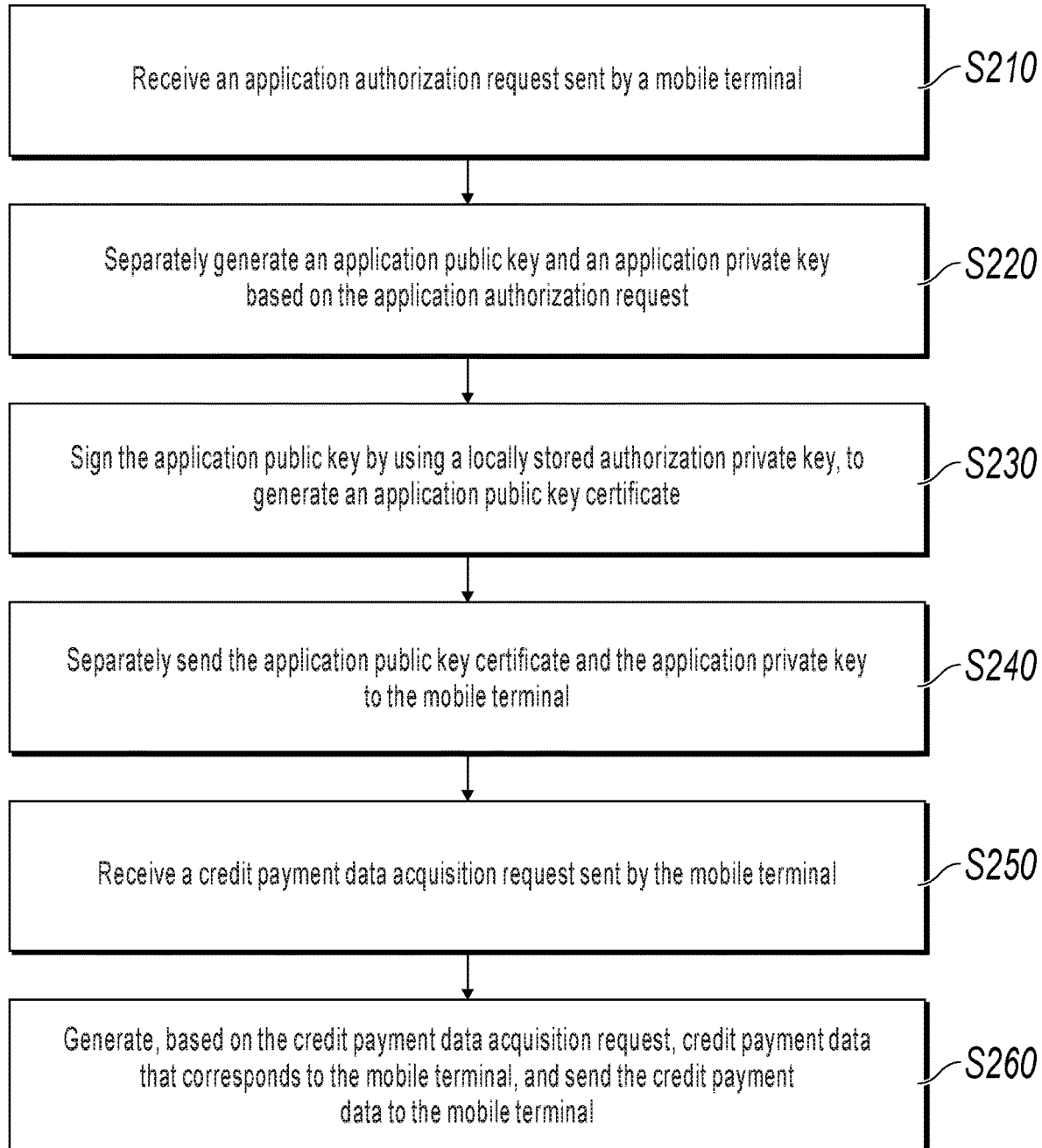
FIG. 6 is a flowchart illustrating a credit payment method based on mobile terminal P2P, according to yet another example implementation.

In another implementation provided in the present disclosure, as shown in FIG. 6, an execution procedure of a server (a serving end of a credit authorization system) in the credit payment method based on mobile terminal P2P provided in the present disclosure can include the following steps.

In step S210, receive an application authorization request sent by a mobile terminal is received.

In step S220, separately generate an application public key and an application private key based on the application authorization request.

In step S230, sign the application public key by using a locally stored authorization private key, to generate an application public key certificate.

In step S240, separately send the application public key certificate and the application private key to the mobile terminal.

Based on the received application authorization request, the server of the credit authorization system generates a pair of keys, that is, the application public key and the application private key. The server signs the application public key by using the locally stored authorization private key, to generate the application public key certificate, and separately sends the obtained application public key certificate and the application private key to the mobile terminal.

In step S250, receive a credit payment data acquisition request sent by the mobile terminal.

In step S260, generate credit payment data that corresponds to the mobile terminal based on the credit payment data acquisition request, and send the credit payment data to the mobile terminal, so that the mobile terminal enables a credit payment function of the mobile terminal based on the received credit payment data.

Credit payment data can be a personalization script, and the personalization script includes a payment card number, a credit limit, an available limit, and a TAC sub-key. The payment card number is a unique character code generated by the credit authorization system for a credit payment application of each user. The available limit is an amount of fund that the user can use currently. The TAC sub-key is obtained by the server in the credit authorization system based on a card number hash by using a TAC parent private key.

Figure 7:
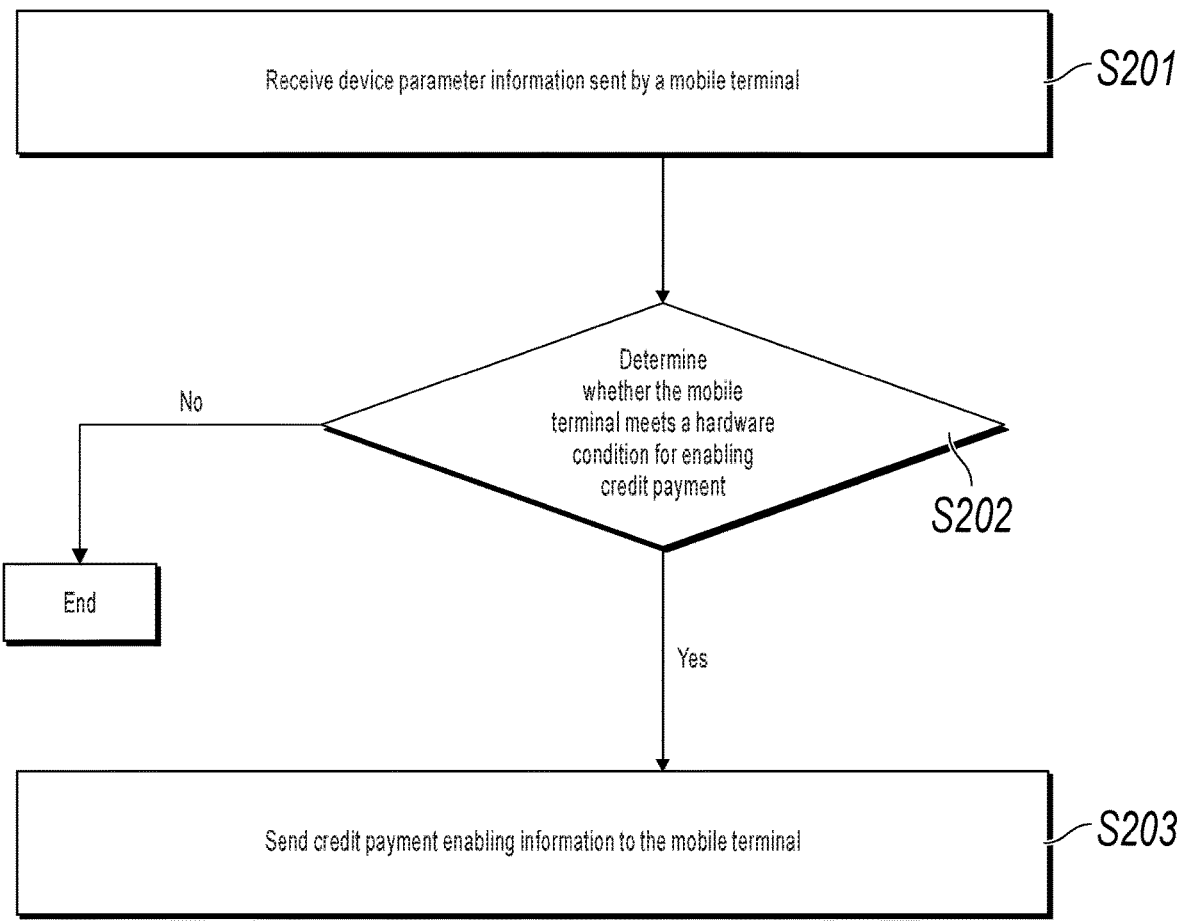
FIG. 7 is a flowchart illustrating a credit payment method based on mobile terminal P2P, according to yet another example implementation.

Based on FIG. 6, as shown in FIG. 7, in another implementation provided in the present disclosure, the server (the serving end of the credit authorization system) determines, based on device parameter information sent by the mobile terminal, whether the mobile terminal meets a hardware condition for enabling credit payment. Therefore, before step S210, the credit payment method based on mobile terminal P2P provided in the implementation of the present disclosure can further include the following steps.

In step S201, receive device parameter information sent by the mobile terminal.

In a process in which the mobile terminal enables the credit payment function, the mobile terminal can communicate with the serving end (namely, the server) of the credit authorization system by using a network, etc. The serving end of the credit authorization system can receive the device parameter information sent by the mobile terminal.

In step S202 determine, based on the device parameter information, whether the mobile terminal meets a hardware condition for enabling credit payment.

The parameter information sent by the mobile terminal can be information such as a device model, a ROM version, a system version (such as, Android), an application version, etc. of the mobile terminal. The server can check, based on the information sent by the mobile terminal, whether the mobile terminal has an NFC function, etc.

If the server checks that the mobile terminal meets the hardware condition for enabling credit payment, the server sends the credit payment enabling information to the mobile terminal. The credit payment enabling information can be a credit payment application enabling page. The user can enter user information on a credit payment application enabling interface of the mobile terminal, and upload the user identity information to the serving end.

If the server detects that the mobile terminal does not meet the hardware condition for enabling credit payment, the server does not send credit payment enabling information to the mobile terminal.

When the mobile terminal meets the hardware condition for enabling credit payment, in step S203, send the credit payment enabling information to the mobile terminal, and step S210 is performed.

Figure 8:
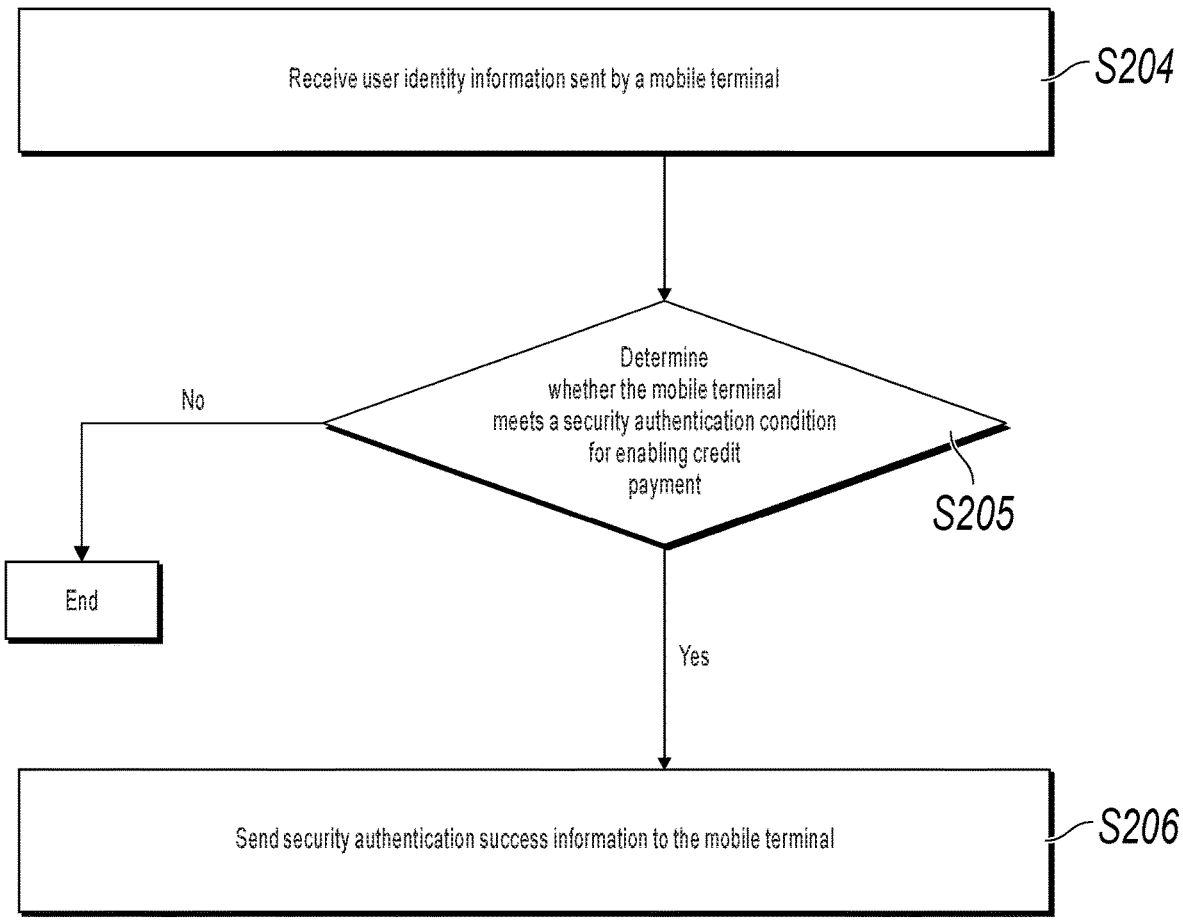
FIG. 8 is a flowchart illustrating a credit payment method based on mobile terminal P2P, according to yet another example implementation.

In addition to checking the device parameter information sent by the mobile terminal, the server in the credit authorization system further needs to check user identity information sent by the mobile terminal, and determine whether a user that corresponds to the mobile terminal meets a security authentication condition. Therefore, based on FIG. 6, as shown in FIG. 8, in a process of enabling the credit payment function of the mobile terminal, before step S210, the credit payment method based on mobile terminal P2P provided in the present disclosure can further include the following steps.

In step S204, receive user identity information sent by the mobile terminal.

The user identity information can be information such as an ID card number, a name, a bank card number, an email address, an Alipay account, etc. of the user.

In step S205, determine, based on the user identity information, whether the mobile terminal meets a security authentication condition for enabling credit payment.

For example, the server can check whether the bank card number in the user identity information provides a service normally, whether is a bad transaction record.

If the server detects that the mobile terminal meets the security authentication condition for enabling credit payment, the server sends the security authentication success information to the mobile terminal.

When the mobile terminal meets the security authentication condition for enabling credit payment, in step S206, send the security authentication success information to the mobile terminal, and step S210 is performed.

Figure 9:
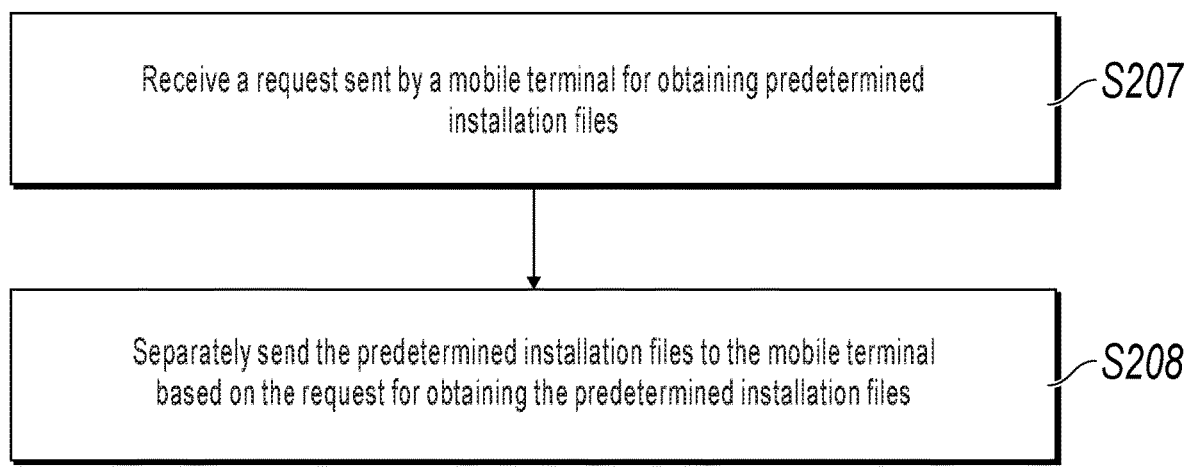
FIG. 9 is a flowchart illustrating a credit payment method based on mobile terminal P2P, according to yet another example implementation.

When the mobile terminal enables credit payment, a credit payment application further needs to be installed, and these installation files need to be sent to the mobile terminal by the server in a credit authorization system. Therefore, based on FIG. 6, as shown in FIG. 9, in another implementation of the present disclosure, before step S210, the credit payment method based on mobile terminal P2P provided in the present disclosure can further include the following steps.

In step S207, receive a request sent by the mobile terminal for obtaining predetermined installation files.

The predetermined installation files include the credit payment application.

In step S208, separately send the predetermined installation files to the mobile terminal based on the request for obtaining the predetermined installation files, and step S210 is performed.

The previous implementations of the present disclosure describe the process of enabling credit payment in the mobile terminal. In some scenarios, the credit payment enabling process can be obtained in other ways, for example, is predetermined on the mobile terminal, or is obtained through a registration application to a credit payment authority. The credit payment enabling process is not limited here.

Figure 10:
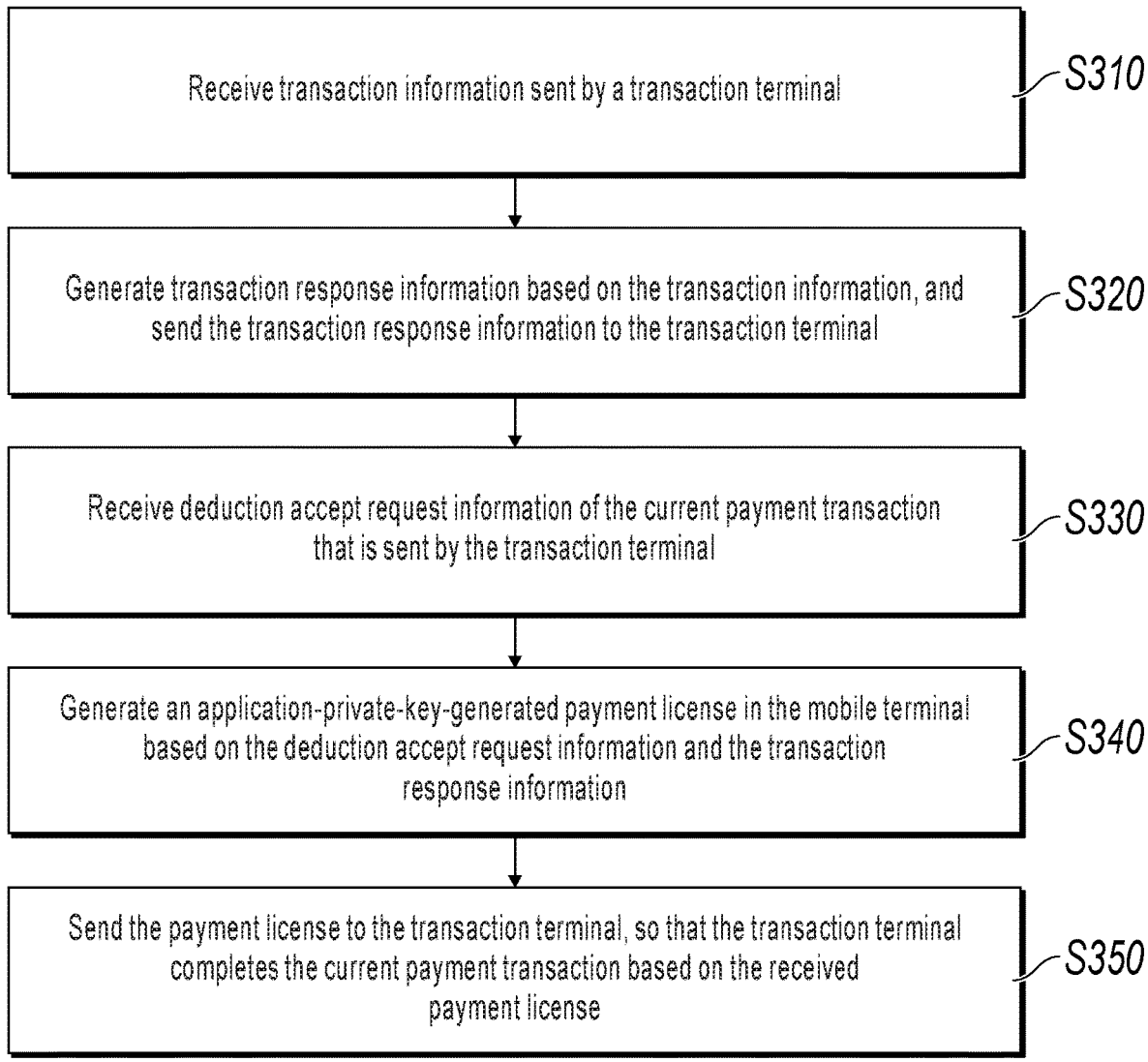
FIG. 10 is a flowchart illustrating a credit payment method based on mobile terminal P2P, according to yet another example implementation.

To resolve the problem in related technologies, an implementation of the present disclosure provides a credit payment method based on mobile terminal P2P, applied to a credit payment process between a mobile terminal and a transaction terminal. As shown in FIG. 10, the method can include the following steps.

In step S310, receive transaction information sent by the transaction terminal.

When a user holds the mobile terminal and approaches the bus gate to make a payment transaction, because the bus gate can generate a radio frequency field, when the mobile terminal approaches the bus gate, that is, when the mobile terminal enters the radio frequency field generated by the bus gate, the mobile terminal can detect the radio frequency field generated by the bus gate, and the bus gate also detects the mobile terminal. In this situation, a communication connection is established between the bus gate and the mobile terminal, the bus gate sends the transaction information to the mobile terminal, and the mobile terminal receives the transaction information sent by the bus gate.

It is worthwhile to note that how to exchange an NFC data exchange format (NDEF) message is described in a P2P mode.

In step S320, generate transaction response information based on the transaction information, and send the transaction response information to the transaction terminal.

In step S330, receive deduction accept request information of the current payment transaction that is sent by the transaction terminal.

After receiving an application public key certificate sent by the mobile terminal, the bus gate performs verification of the application public key certificate, generates the current payment transaction deduction information, and sends the deduction information to the mobile terminal. The mobile terminal receives the deduction information sent by the bus gate.

In step S340, generate an application-private-key-generated payment license in the mobile terminal based on the deduction accept request information and the transaction response information.

The payment license generated by the mobile terminal includes signature data and a transaction authentication code (TAC).

In step S350, send the payment license to the transaction terminal, so that the transaction terminal completes the current payment transaction based on the received payment license.

After receiving the payment license sent by the mobile terminal, the bus gate verifies the payment license. If the license is verified. It is determined that the current payment transaction is completed.

After sensing the mobile terminal, the bus gate can ensemble an Simple NFC data exchange format (NDEF) Exchange Protocol (SNEP) get request message and send the SNEP get request message to a bus credit payment application. The information field identifier message of the message is read card information. After receiving the SNEP get request message, the bus credit payment application assembles, into an SNEP response message, data that needs to be returned, and the SNEP response message includes a card number, an available limit, an entry/exit flag, and information about a last transaction; and returns the SNEP response message to the gate. The information about the last transaction includes station information, a transaction date, a transaction time, etc.

It is worthwhile to note that an SNEP request message is a request message sent by an SNEP client to an SNEP server in P2P. There are two types of SNEP request messages: a get message and a put message. The get message requests the server to return data, and the put message requests the server to accept data. An SNEP get request message and an SNEP put request message are distinguished in the specification. The SNEP response message is a response message returned by the SNEP server to the SNEP client in P2P. The get message requests to return data, and the put message requests to return response code indicating a success or a failure.

Return request information is equivalent to the SNEP get request message, and the transaction response information is equivalent to the SNEP response message.

In the method provided in this implementation of the present disclosure, when the user makes a payment transaction with the transaction terminal by using the mobile terminal, the mobile terminal successively sends, based on the relevant instruction information sent by the transaction terminal, the application public key certificate, and the generated payment authorization license to the transaction terminal, and the transaction terminal completes the current payment transaction based on the information sent by the mobile terminal. Compared with a problem in related technologies, in the credit payment method provided in this implementation of the present disclosure, when making a transaction with the transaction terminal by using the mobile terminal, the user can separately make the mobile terminal and the transaction terminal be offline, so that credit consumption is used for a user account of the mobile terminal in a subsequent payment transaction process. The account is settled only after the user makes purchase by using the mobile terminal, so that the user can be protected from a capital loss risk caused by using cash in a transaction.

Figure 11:
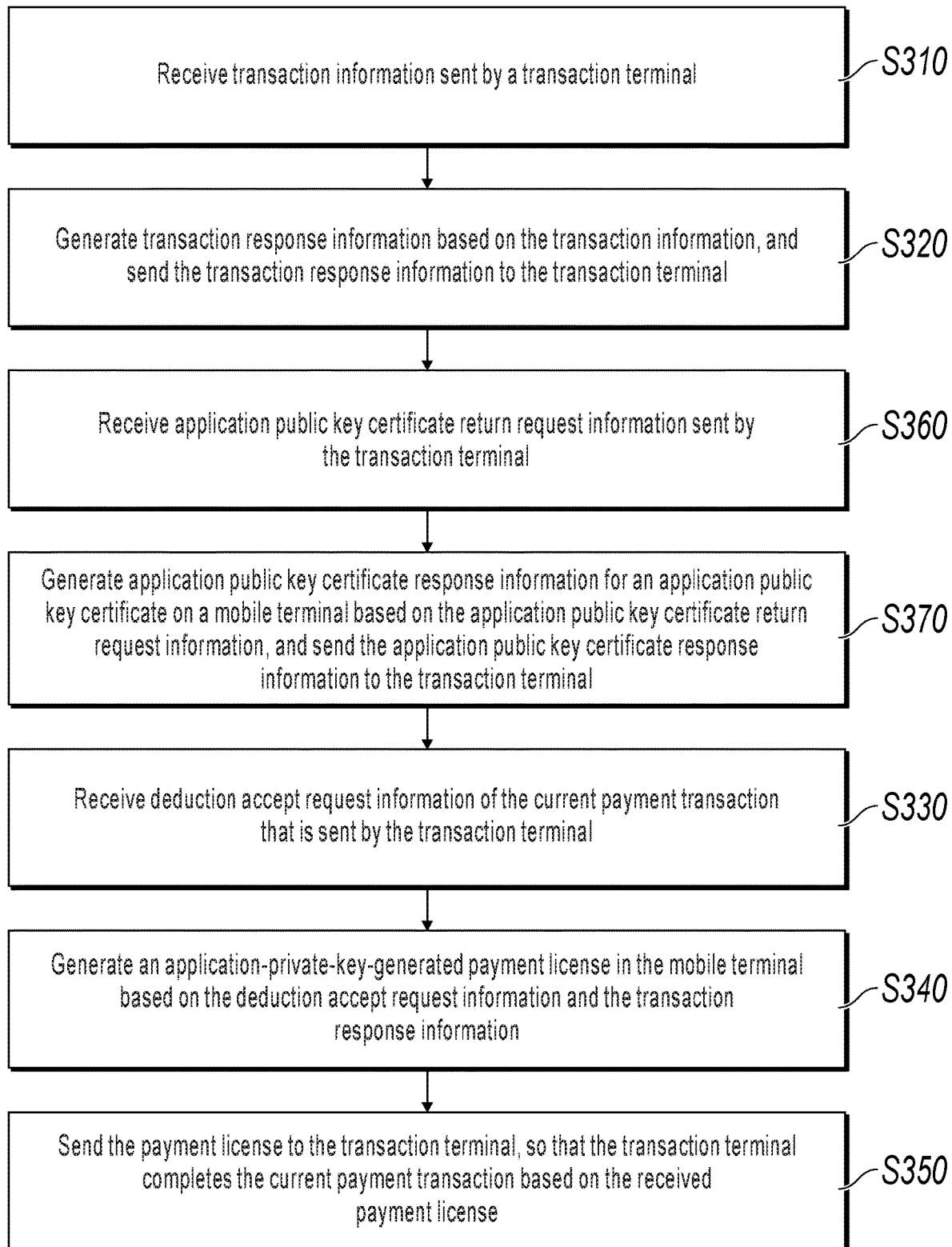
FIG. 11 is a flowchart illustrating a credit payment method based on mobile terminal P2P, according to yet another example implementation.

As a refinement of the method in FIG. 10, in another implementation of the present disclosure, as shown in FIG. 11, after step S320, the method can further include the following steps.

In step S360, receive application public key certificate return request information sent by the transaction terminal.

In step S370, generate application public key certificate response information for the application public key certificate on the mobile terminal based on the application public key certificate return request information, and send the application public key certificate response information to the transaction terminal.

The application public key certificate response information corresponds to the application public key certificate return request information and meets a data transmitting and receiving format requirement.

Figure 12:
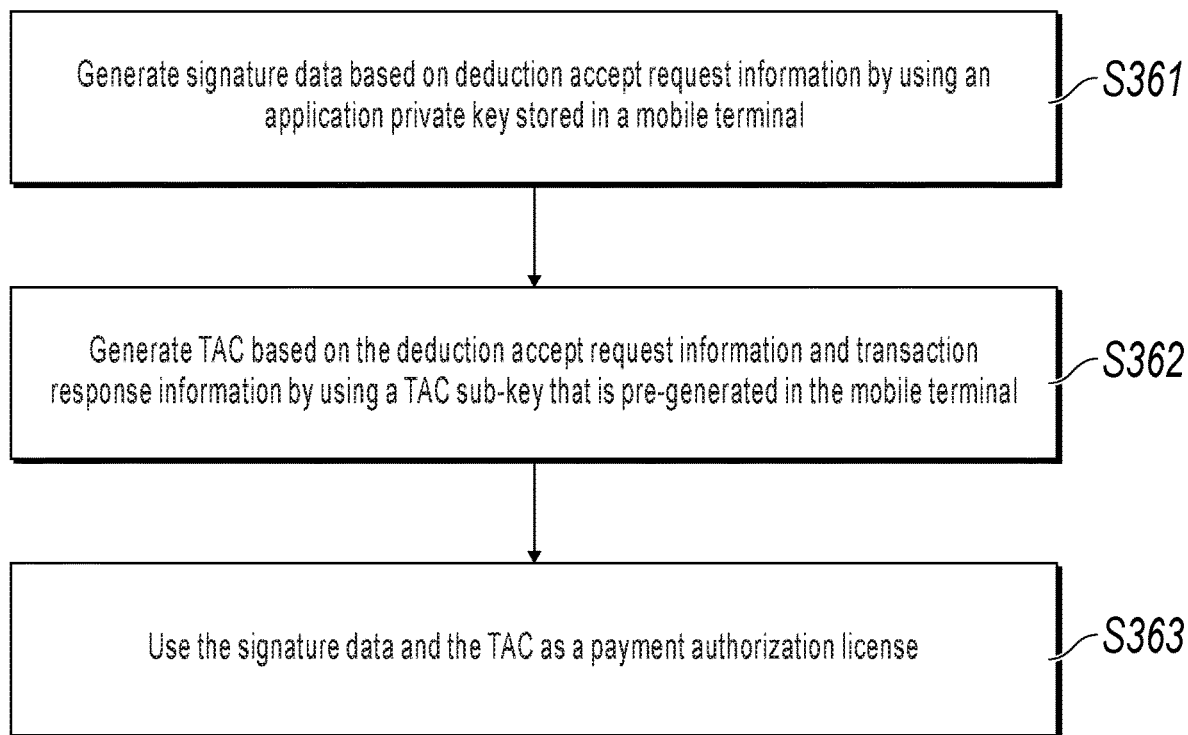
FIG. 12 is a flowchart illustrating a credit payment method based on mobile terminal P2P, according to yet another example implementation.

To describe in detail in the present implementation of the present disclosure, how the mobile terminal generates the payment authorization license so the transaction terminal can complete the current payment transaction based on the authorization license sent by the mobile terminal, as refinement of the method in FIG. 10, in another implementation of the present disclosure, as shown in FIG. 12, step S340 can further include the following steps.

In step S361, generate signature data based on the deduction accept request information by using an application private key stored in the mobile terminal.

The application private key is pre-generated and stored on the mobile terminal. The credit payment application signs the deduction information by using the application private key, to generate the signature data. The deduction information includes a deduct amount, a date and time of the current payment transaction, an entry/exit flag on the current payment transaction sign, and station information of the current payment transaction.

In step S362, generate a TAC based on the deduction accept request information and the transaction response information by using a TAC sub-key that is pre-generated on the mobile terminal.

The deduction accept request information includes the deduction information, and the transaction response information includes the transaction information. The credit payment application on the mobile terminal encrypts the deductible amount, the date of the current payment transaction, the time of the current payment transaction, the payment card number, the available limit, and a credit limit based on the deduction information and the transaction information, to generate the TAC. The credit limit is the maximum available amount authorized by a credit authorization system to the user in an offline mode.

In step S363, use the signature data and the TAC as the payment authorization license.

The credit payment application can send the signature data and the TAC to the bus gate separately as the payment authorization license or can send the signature data and the TAC together to the bus gate as a credit authorization license.

In addition, the transaction response information includes the payment card number, the available limit, the entry/exit flag, and the information about the last transaction. The payment card number is a unique character code generated by the credit authorization system for each user's a credit payment application. The available limit is an amount of fund that the user can use currently. The TAC sub-key is obtained by a server in the credit authorization system based on a card number hash by using a TAC parent private key. The information about the last transaction includes the station information, the transaction date, the transaction time, etc.

Figure 13:
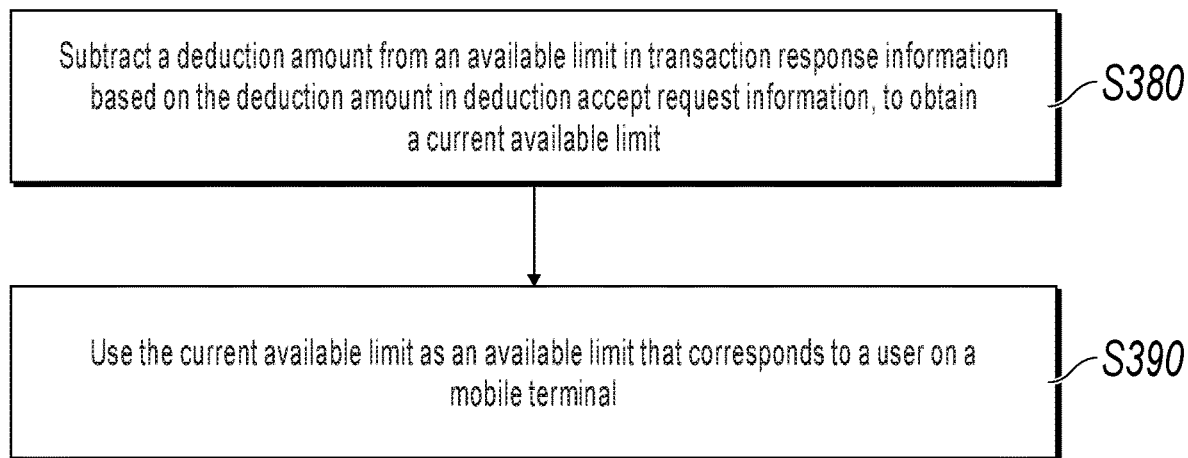
FIG. 13 is a flowchart illustrating a credit payment method based on mobile terminal P2P, according to yet another example implementation.

Based on FIG. 10, as shown in FIG. 13, in another implementation of the present disclosure, the method can further include the following steps.

In step S380, subtract the deduction amount from the available limit in the transaction response information based on the deduction amount in the deduction accept request information, to obtain a current available limit.

In step S390, use the current available limit as an available limit that corresponds to a user on the mobile terminal.

Figure 14:
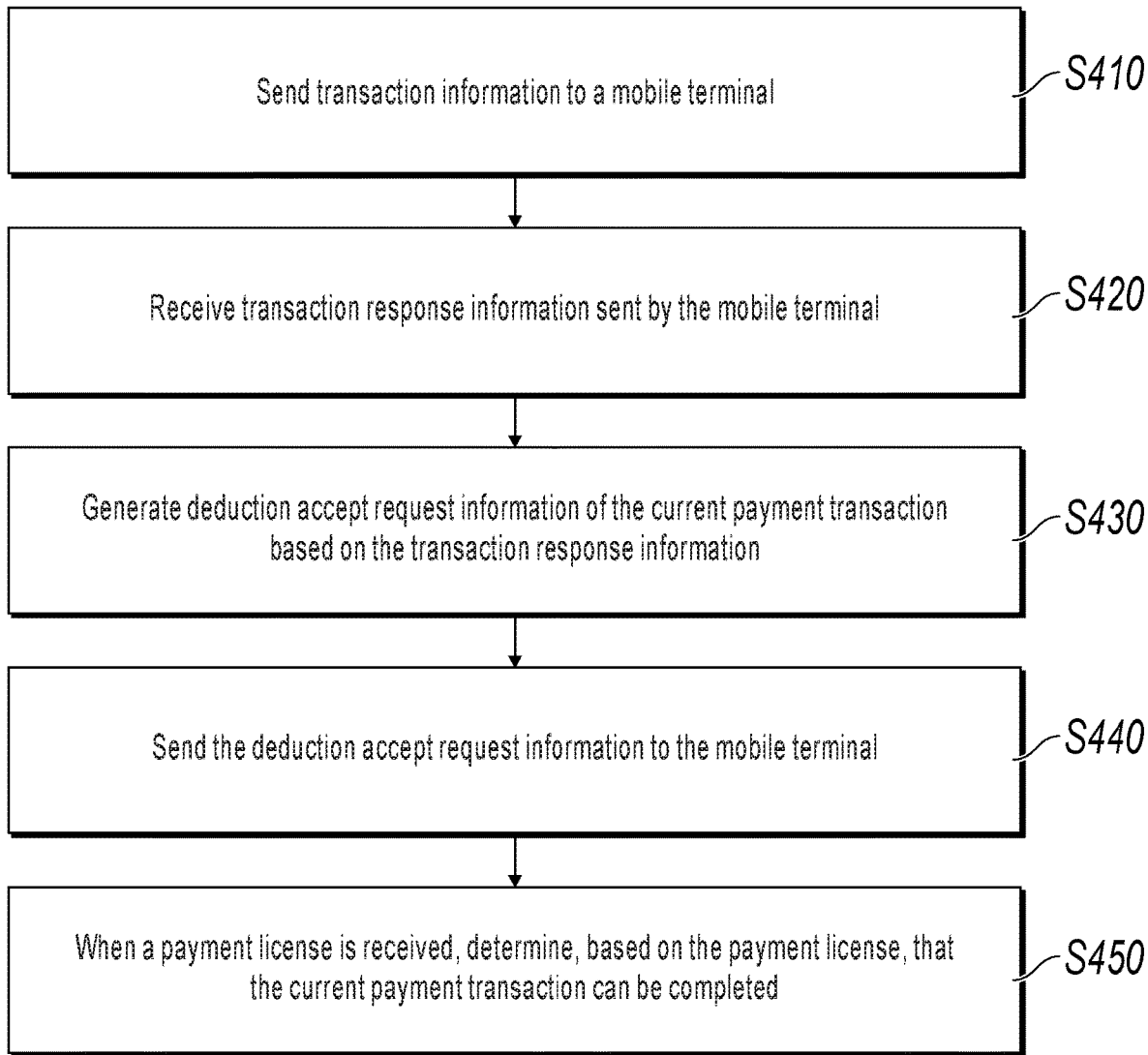
FIG. 14 is a flowchart illustrating a credit payment method based on mobile terminal P2P, according to yet another example implementation.

To describe a transaction payment process between the mobile terminal and transaction terminal in detail, an implementation of the present disclosure provides a credit payment method based on mobile terminal P2P. In an execution procedure on a transaction terminal side, as shown in FIG. 14, the method can include the following steps.

In step S410, send transaction information to the mobile terminal.

In step S420, receive transaction response information sent by the mobile terminal.

In step S430, generate deduction accept request information of the current payment transaction based on the transaction response information.

In step S440, send the deduction accept request information to the mobile terminal.

In step S450, when a payment license is received, determine, based on the payment license, that the current payment transaction can be completed.

Because the method shows the execution procedure on a bus gate side in the credit payment transaction process, which corresponds to the execution procedure on the mobile terminal side in the credit payment transaction process, data exchange between the bus gate and the mobile terminal is not described here again. For details, refer to the execution procedure on the mobile terminal side in the previous implementation.

It is worthwhile to note that the transaction information, the transaction response information, the public key certificate return request information, the public key certificate response information, etc. in the implementations are used to meet a format requirement in a data exchange process. For example, the transaction response information can be understood as response information including the transaction information, and the public key certificate response information can be understood as response information including a public key certificate.

In addition, the transaction response information includes a payment card number, an available limit, an entry/exit flag, and information about a last transaction.

Figure 15:
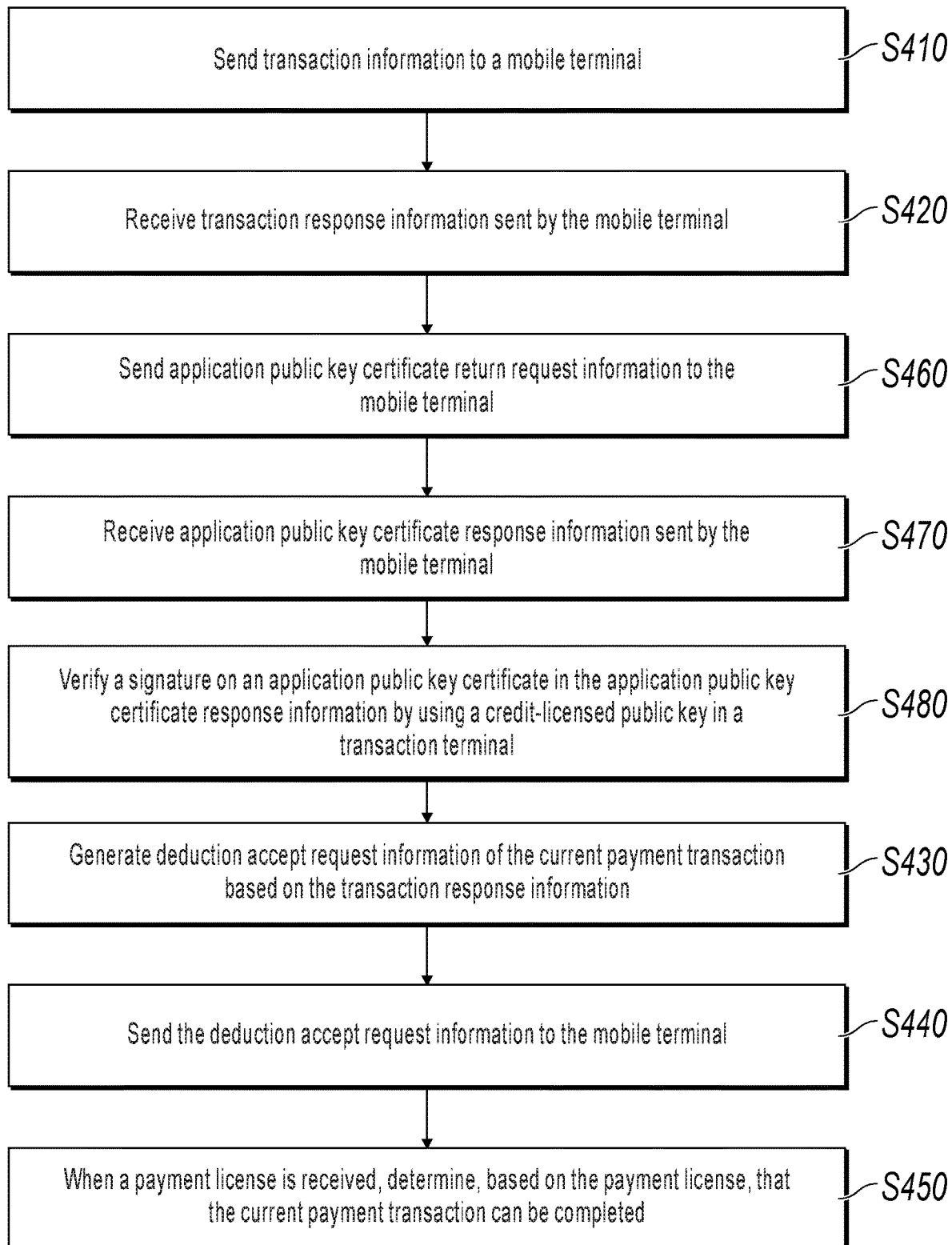
FIG. 15 is a flowchart illustrating a credit payment method based on mobile terminal P2P, according to yet another example implementation.

Based on FIG. 14, as shown in FIG. 15, in another implementation provided in the present disclosure, after step S420, the method can further include the following steps.

In step S460, send application public key certificate return request information to the mobile terminal.

In step S470, receive application public key certificate response information sent by the mobile terminal In step S480, verify a signature on an application public key certificate in the application public key certificate response information by using a credit-licensed public key in the transaction terminal.

Because the method shows the execution procedure on a bus gate side in the credit payment transaction process, which corresponds to the execution procedure on the mobile terminal side in the credit payment transaction process, data exchange between the bus gate and the mobile terminal is not described here again. For details, refer to the execution procedure on the mobile terminal side in the previous implementation.

Figure 16:
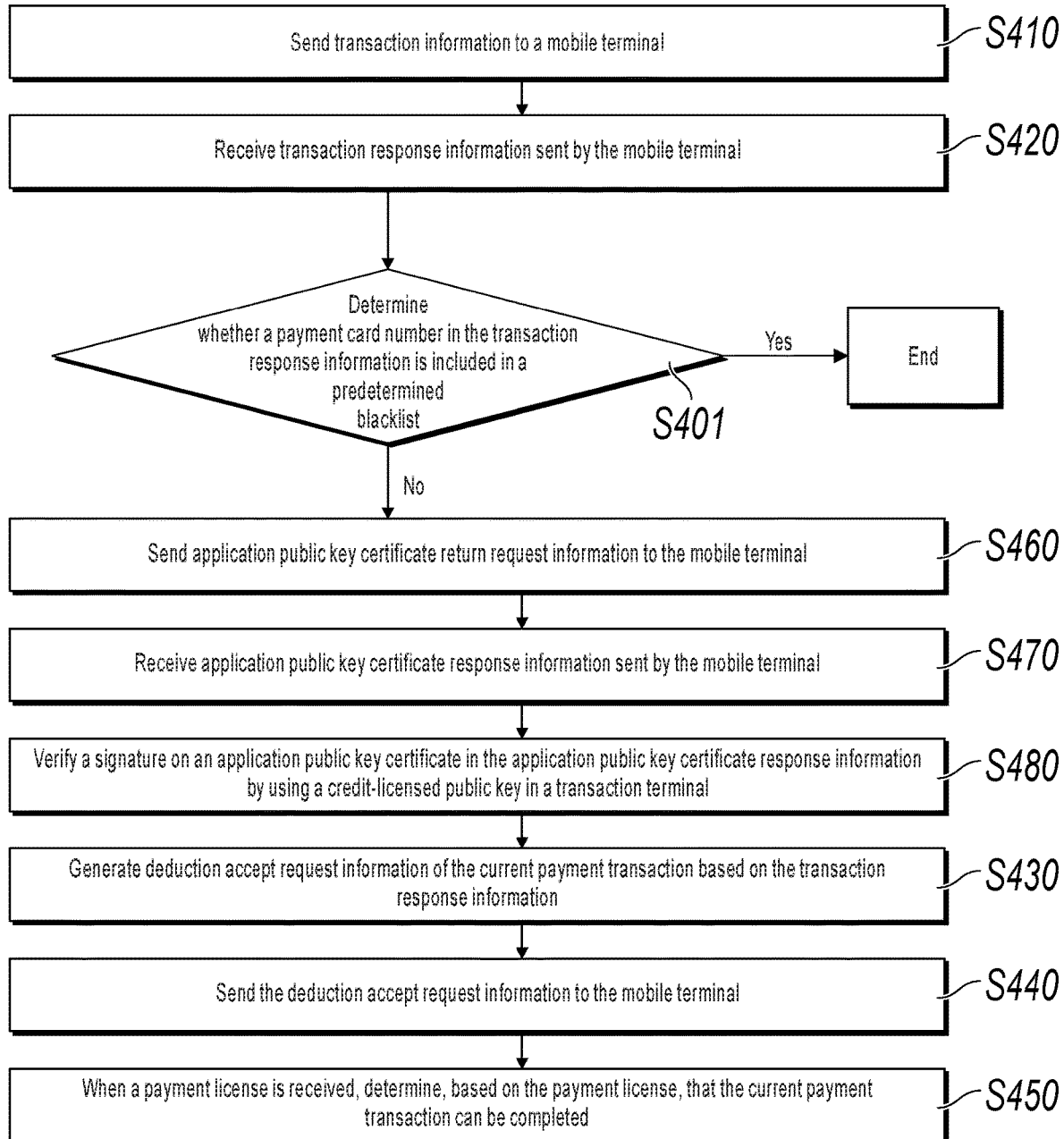
FIG. 16 is a flowchart illustrating a credit payment method based on mobile terminal P2P, according to yet another example implementation.

Based on FIG. 14, as shown in FIG. 16, in another implementation provided in the present disclosure, the method can further include the following steps.

In step S401, determine whether the payment card number in the transaction response information is included in a predetermined blacklist.

When the payment card number in the transaction response information is not included in the predetermined blacklist, step S460 is performed.

The blacklist can be predetermined in the transaction terminal, namely, the bus gate. User identity information that corresponds to the mobile terminal is compared with information in the blacklist. If the user identity information exists in the blacklist, this transaction payment procedure is stopped to avoid a malicious transaction.

Figure 17:
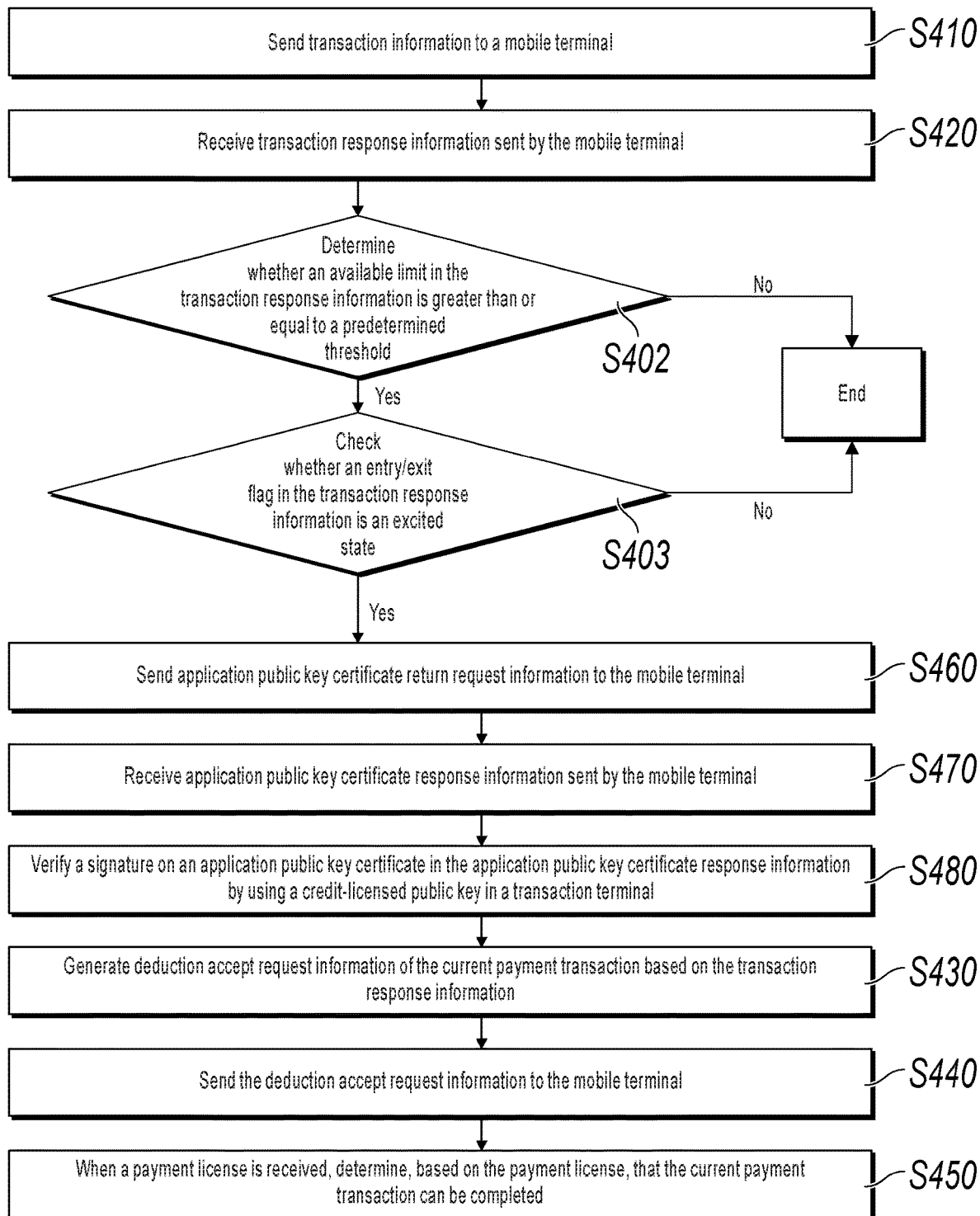
FIG. 17 is a flowchart illustrating a credit payment method based on mobile terminal P2P, according to yet another example implementation.

Based on FIG. 14, as shown in FIG. 17, in another implementation provided in the present disclosure, the method can further include the following steps.

In step S402, determine whether the available limit in the transaction response information is greater than or equal to a predetermined threshold.

If the available limit is greater than or equal to the predetermined threshold, in step S403, check whether the entry/exit flag in the transaction response information is an exited state.

If the entrance/exit flag in the transaction information is an exited state, step S460 is performed.

The available limit of a user is checked, to determine whether the credit payment transaction needs to be continued. When the available limit of the user is less than a deduction amount of this transaction, this credit payment transaction is stopped, so that a malicious payment transaction can be avoided.

The present step is mainly used by the bus gate to check, based on the transaction response information sent by the mobile terminal, whether an available limit of a user account that corresponds to the mobile terminal is enough to pay for the current payment transaction. If the available limit is insufficient, the current payment transaction is rejected. If the available limit is sufficient, the bus gate checks whether the entry/exit flag in the transaction response information is 0. If the entry/exit flag is not 0, the current payment transaction is rejected. If the entry/exit flag is 0, the current payment transaction is continued. It is worthwhile to note that, when an entry/exit flag 1, it indicates that the user who holds the mobile terminal is in an "entered" state, and therefore the current payment transaction is rejected. When the entry/exit flag is 0, it indicates that the user who holds the mobile terminal is in an "exited" state, and an account can be settled, so the current payment transaction is made.

Figure 18:
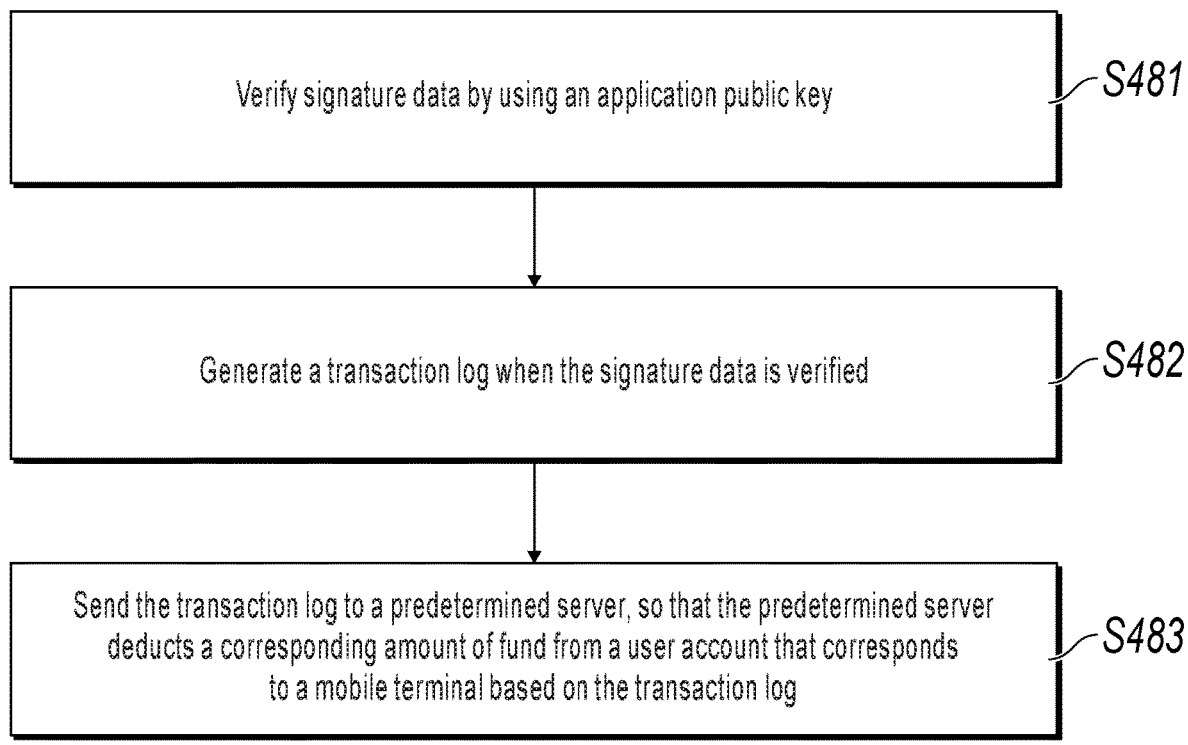
FIG. 18 is a flowchart illustrating step S450 in FIG. 14.

Based on FIG. 14, as shown in FIG. 18, in another implementation provided in the present disclosure, step S450 can include the following steps.

In step S481, verify the signature data by using an application public key.

The application public key is restored by the bus gate from the payment authorization license sent by the mobile terminal, and the application public key checks whether related information in the signature data matches corresponding information in the application public key. If yes, the signature verification passes.

In step S482, generate a transaction log when the signature data is verified.

After the bus gate verifies the signature data, the transaction log of the current payment is generated. The transaction log includes: a deduction amount, a transaction date, a transaction time, a transaction terminal ID, a payment card number, an available limit, and a TAC.

In step S483, send the transaction log to a predetermined server, so that the predetermined server deducts a corresponding amount of fund from a user account that corresponds to the mobile terminal based on the transaction log.

The transaction log includes a deduction amount, a transaction date, a transaction time, a transaction terminal ID, a payment card number, an available limit, and a TAC. The payment license includes signature data and a TAC.

Figure 19:
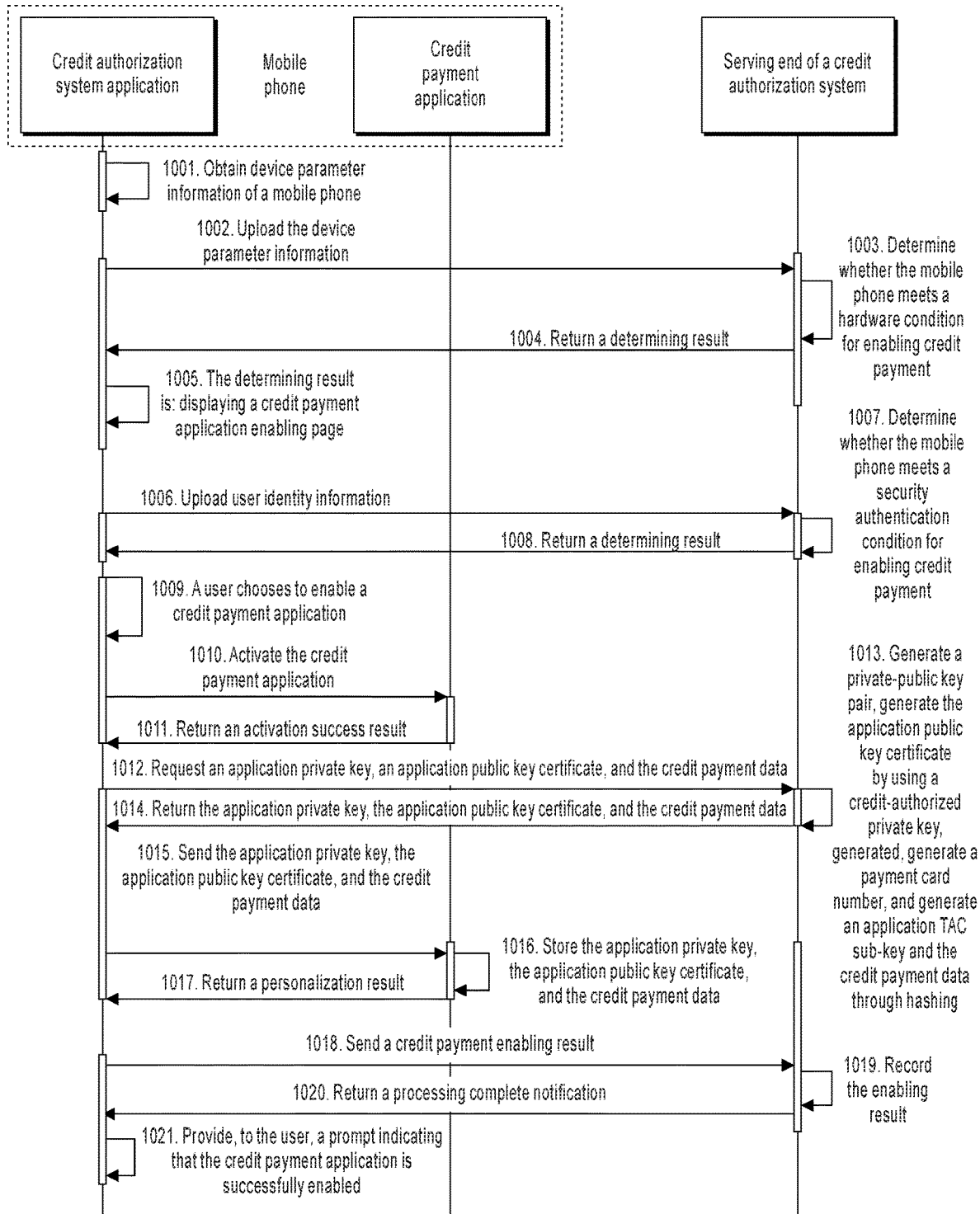
FIG. 19 is a diagram illustrating a data exchange procedure between a credit authorization system application, a credit payment application, and a serving end of a credit authorization system.

In another implementation provided in the present disclosure, as shown in FIG. 19, the present disclosure provides a credit payment method based on mobile terminal P2P. In this implementation, a mobile phone represents a mobile terminal, and a serving end of a credit authorization system represents a server. When the mobile phone enables a credit payment function, a procedure among a credit authorization system application on the mobile phone, a credit payment application on the mobile phone, and the serving end of the credit authorization system includes the following steps:

Step 1001: Obtain device parameter information of the mobile phone.

Step 1002: Upload the device parameter information.

Step 1003: Determine whether the mobile phone meets a hardware condition for enabling credit payment.

Step 1004: Return a determining result.

Step 1005: The determining result is: displaying a credit payment application enabling page.

Step 1006: Upload user identity information.

Step 1007: Determine whether the mobile phone satisfies a security authentication condition for enabling credit payment.

Step 1008: Return a determining result.

Step 1009: A user chooses to enable the credit payment application.

Step 1010: Activate the credit payment application.

Step 1011: Return an activation success result.

Step 1012: Request an application private key, an application public key certificate, and credit payment data.

Step 1013: Generate a private-public key pair, generate the application public key certificate by using a credit-authorized private key, generate a payment card number, and generate an application TAC sub-key and the credit payment data through hashing.

Step 1014: Return the application private key, the application public key certificate, and the credit payment data.

Step 1015: Send the application private key, the application public key certificate, and the credit payment data.

Step 1016: Store the application private key, the application public key certificate, and the credit payment data.

Step 1017: Return a personalization result.

Step 1018: Send a credit payment enabling result.

Step 1019: Record the enabling result.

Step 1020: Return a processing complete notification.

Step 1021: Provide, to the user, a prompt indicating that the credit payment application is successfully enabled.

Figure 20:
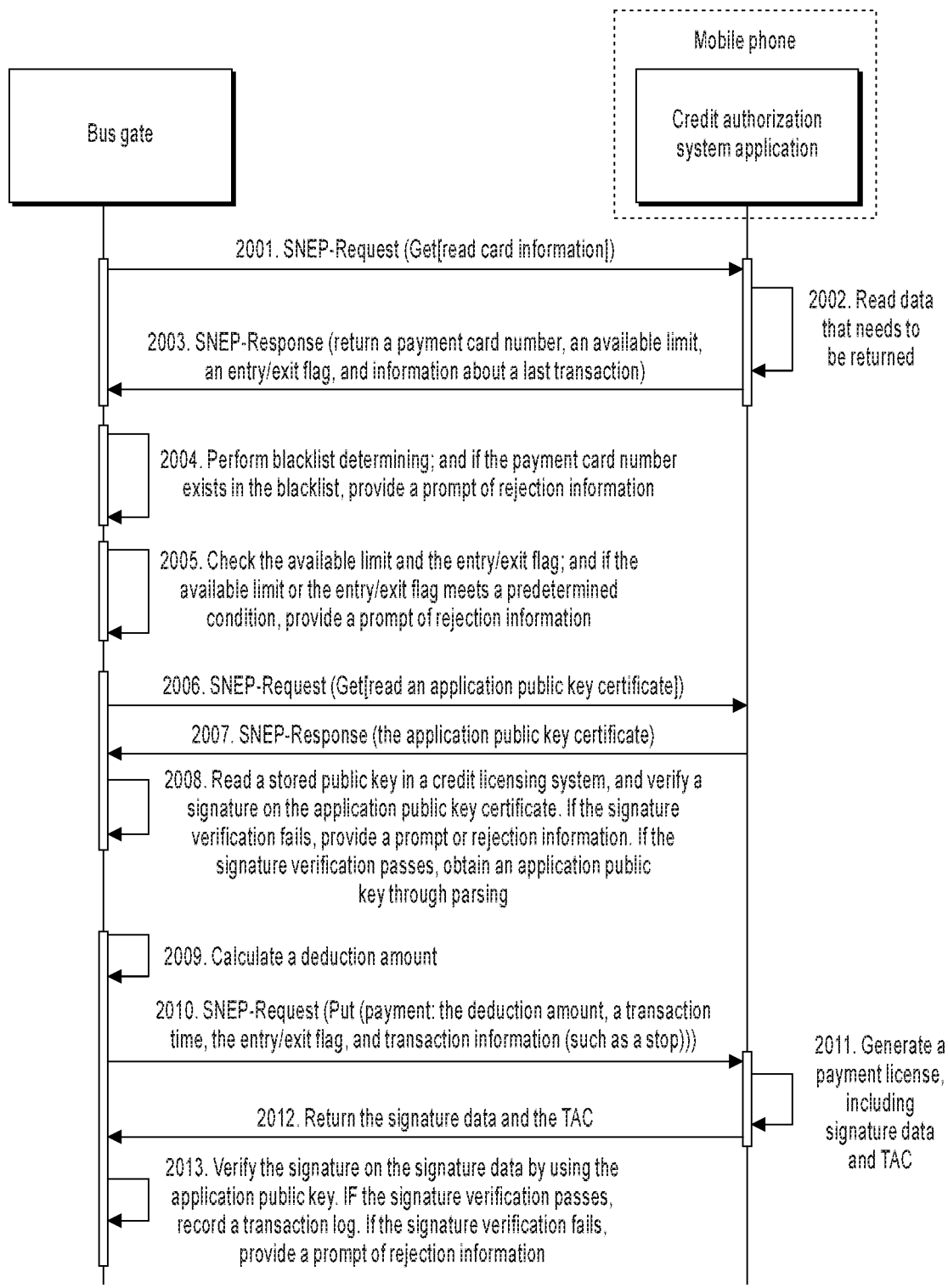
FIG. 20 is a diagram illustrating data exchange between a bus gate and a credit authorization system application.

In another implementation provided in the present disclosure, as shown in FIG. 20, the present disclosure provides a credit payment method based on mobile terminal P2P. In a process in which a mobile terminal performs payment transaction, a data exchange procedure between the mobile terminal and a bus gate is as follows:

Step 2001: Send an SNEP-Request (Get [read card information]).

Step 2002: Read data that needs to be returned.

Step 2003: Return an SNEP-Response (return a payment card number, an available limit, an entry/exit flag, and information about a last transaction).

Step 2004: Perform blacklist determining; and if the payment card number exists in the blacklist, provide a prompt of rejection information.

Step 2005: Check the available limit and the entry/exit flag; and if the available limit or the entry/exit flag does not meet a predetermined condition, provide a prompt of rejection information.

Step 2006: Send an SNEP-Request (Get [read an application public key certificate]).

Step 2007: Return an SNEP-Response (the application public key certificate).

Step 2008: Read a stored public key in a credit authorization system, and verify a signature on the application public key certificate. If the signature verification fails, provide a prompt of rejection information. If the signature verification passes, obtain an application public key through parsing.

Step 2009: Calculate a deduction amount.

Step 2010: Send an SNEP-Request (Put (payment: the deduction amount, a transaction time, the entry/exit flag, and transaction information (such as a stop))).

Step 2011: Generate a payment authorization, including signature data and TAC.

Step 2012: Return the signature data and the TAC.

Step 2013: Verify the signature data by using the application public key. If the signature verification passes, record a transaction log. If the signature verification fails, provide a prompt of rejection information.

Figure 21:
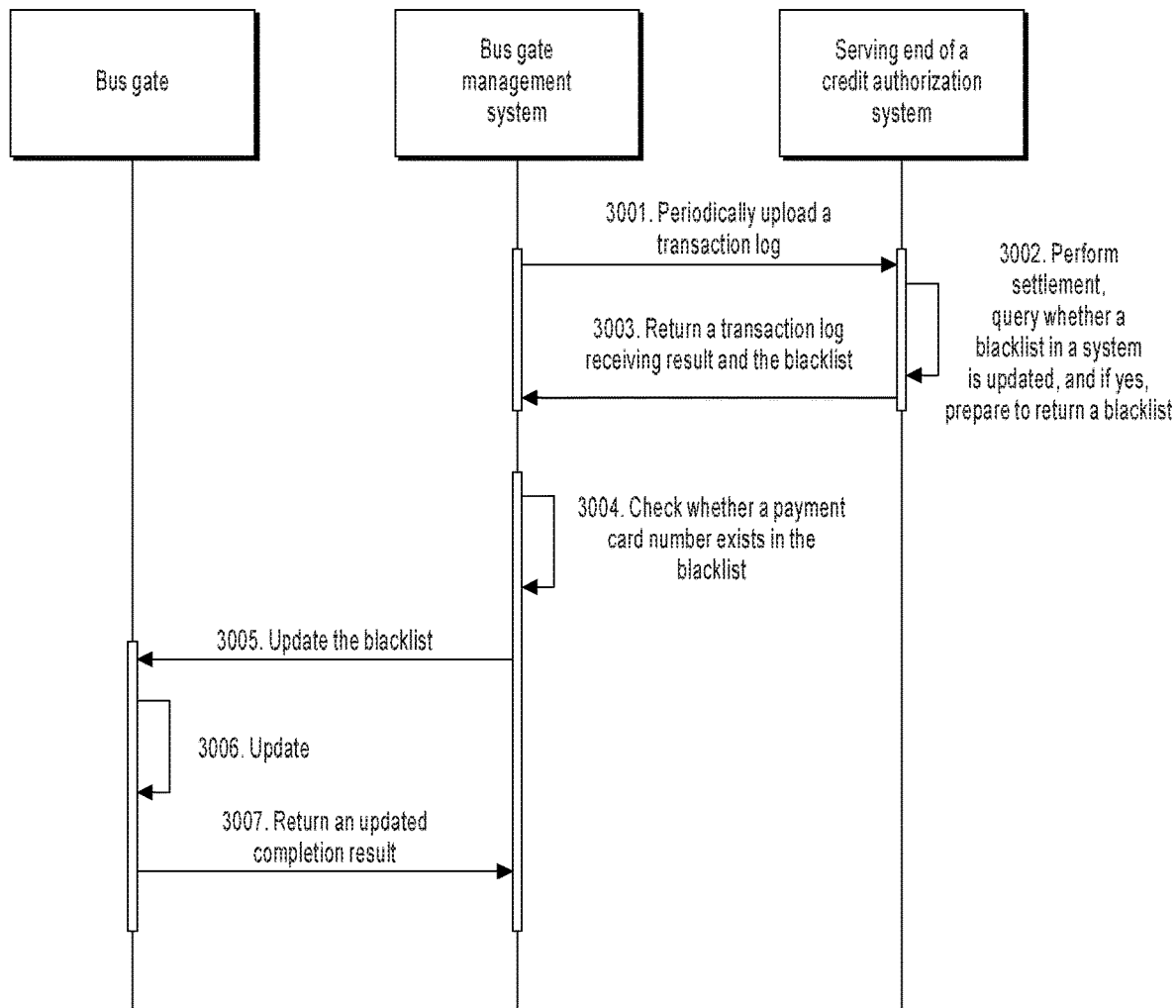
FIG. 21 is a diagram illustrating data exchange between a bus gate and a serving end of a credit authorization system.

In addition, as shown in FIG. 21, a bus gate further needs to periodically upload a transaction log to a credit authorization system, and update a blacklist. In a credit payment method based on mobile terminal P2P provided in the present disclosure, a data exchange procedure between the bus gate (a transaction terminal) and a server end of the credit authorization system is as follows:

Step 3001: Periodically upload a transaction log.

Step 3002: Perform settlement, query whether a blacklist in the system is updated, and if yes, prepare to return a blacklist.

Step 3003: Return a transaction log receiving result and the blacklist.

Step 3004: Check whether a payment card number exists in the blacklist.

Step 3005: The bus gate updates the blacklist.

Step 3006: Update.

Step 3007: Return an updated completion result.

A bus gate management system can be located in the bus gate.

The previous implementations of the present disclosure are described by using credit payment for a bus as an example. It can be understood that the previous implementations can also be applied to other scenarios, such as offline business payment and subway payment. There can be different implementations in specific application scenarios.

By using the descriptions of the previous method implementations, a person skilled in the art can clearly understand that the present disclosure can be implemented by using software and a necessary universal hardware platform, and can be implemented by hardware, but in many situations, the former is a preferred implementation. Based on such an understanding, the technical solutions of the present disclosure essentially, or the part contributing to the existing technology can be implemented in a form of a software product. The computer software product is stored in a storage medium, and includes several instructions for instructing a computer device (which can be a personal computer, a server, a network device, etc.) to perform all or some of the steps of the methods described in the implementations of the present disclosure. The storage medium includes any medium that can store program code, such as a read-only memory (ROM), a random access memory (RAM), a magnetic disk, or an optical disc.

Figure 22:
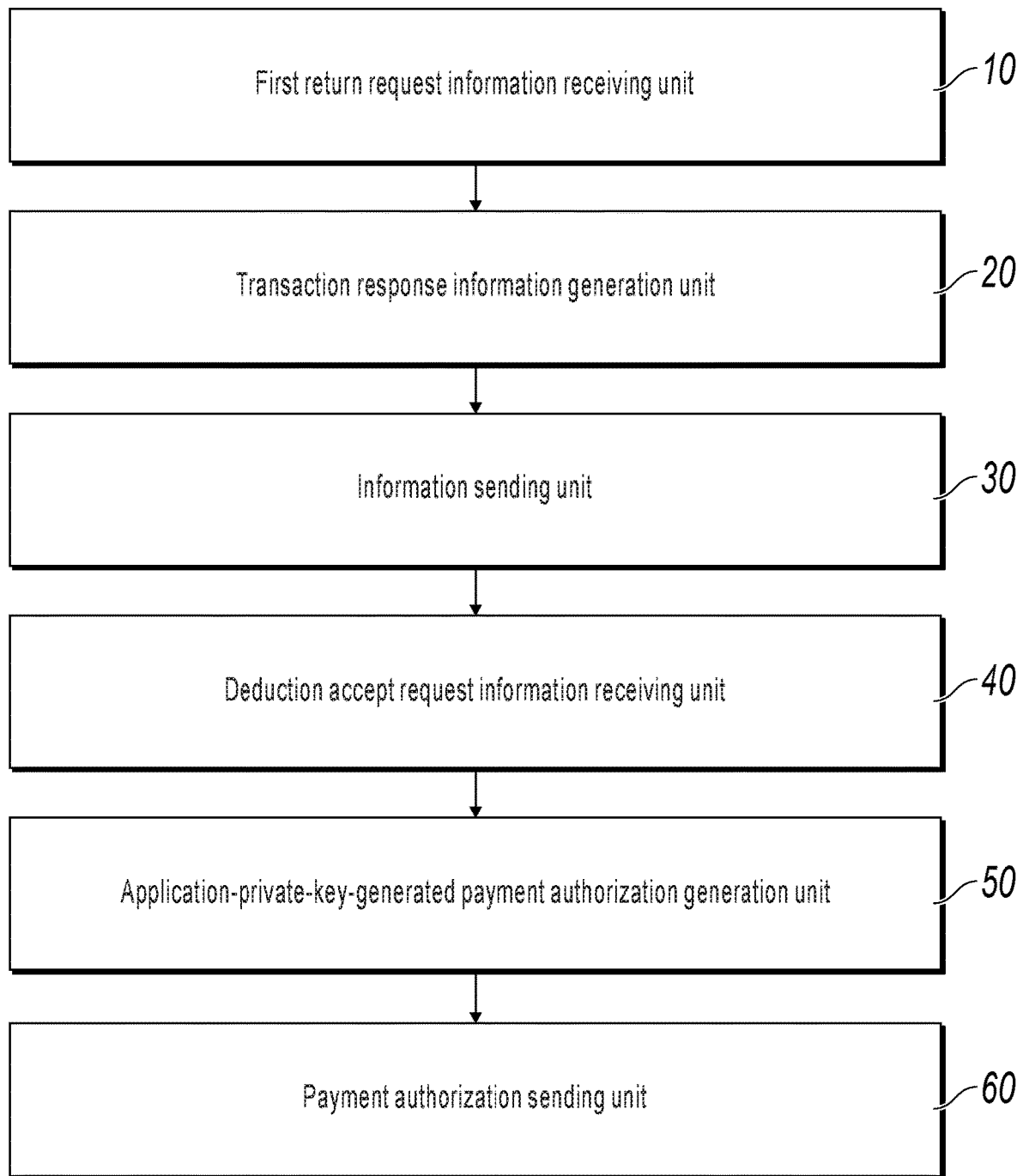
FIG. 22 is a schematic diagram illustrating a credit payment apparatus based on mobile terminal P2P, according to yet another example implementation.

In addition, as an implementation of the previous implementations, an implementation of the present disclosure further provides a credit payment apparatus based on mobile terminal P2P. The apparatus is located in a mobile terminal. As shown in FIG. 22, the apparatus includes a first return request information receiving unit 10, a transaction response information generation unit 20, an information sending unit 30, a deduction accept request information receiving unit 40, an application-private-key-generated payment authorization generation unit 50, and a payment authorization sending unit 60.

The first return request information receiving unit 10 is configured to receive transaction information sent by a transaction terminal.

The transaction response information generation unit 20 is configured to generate transaction response information based on the transaction information.

The information sending unit 30 is configured to send the transaction response information to the transaction terminal.

The deduction accept request information receiving unit 40 is configured to receive deduction accept request information of the current deduction transaction that is sent by the transaction terminal.

The application-private-key-generated payment authorization generation unit 50 is configured to generate an application-private-key-generated payment authorization in the mobile terminal based on the deduction accept request information and the transaction response information.

The payment authorization sending unit 60 is configured to send the payment authorization to the transaction terminal, so that the transaction terminal completes the current payment transaction based on the received payment authorization.

Figure 23:
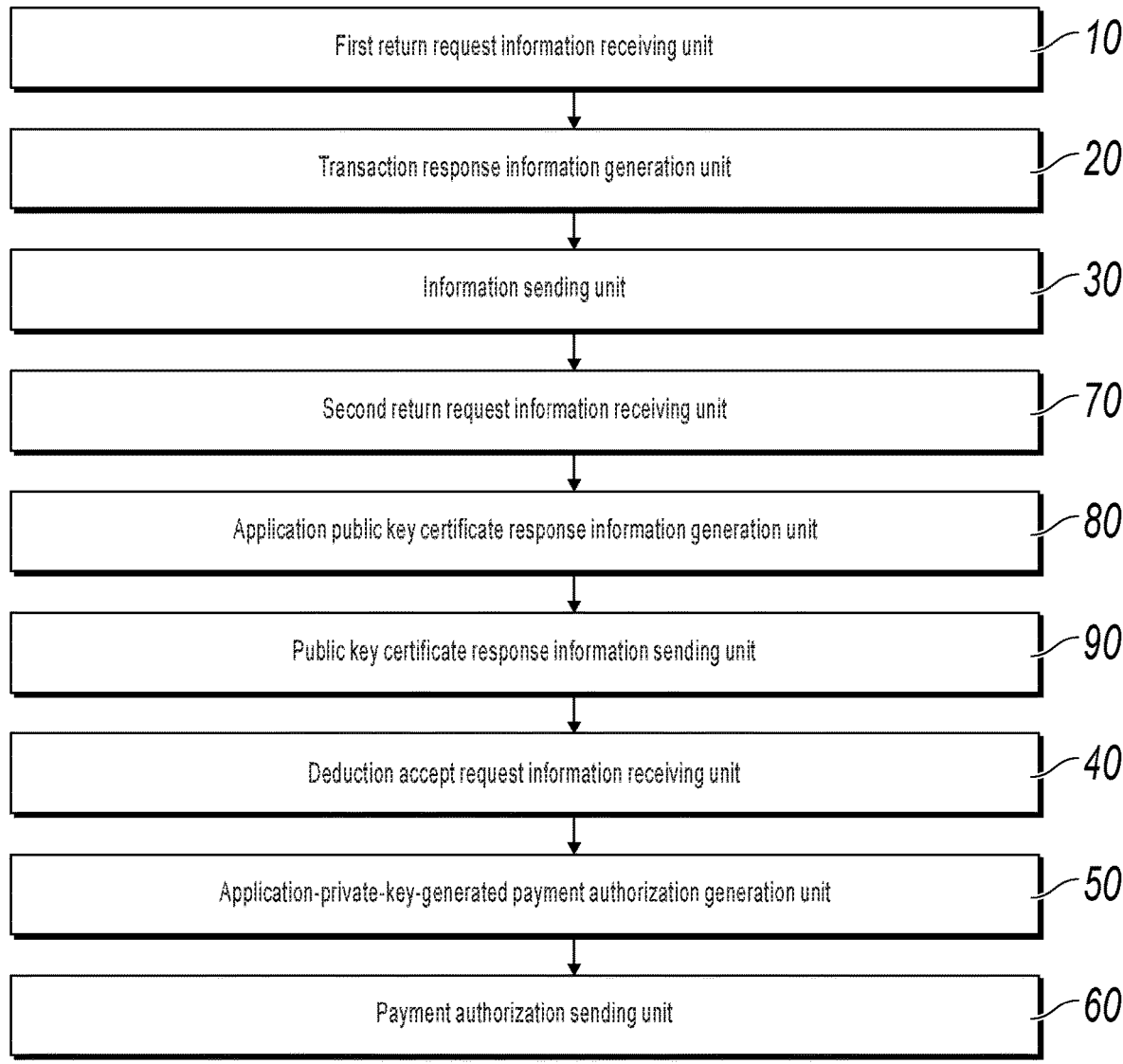
FIG. 23 is a schematic diagram illustrating a credit payment apparatus based on mobile terminal P2P, according to yet another example implementation.

In another implementation of the present disclosure, based on FIG. 22, as shown in FIG. 23, the apparatus further includes: a second return request information receiving unit 70, configured to receive application public key certificate return request information sent by the transaction terminal; an application public key certificate response information generation unit 80, configured to generate application public key certificate response information for an application public key certificate in the mobile terminal based on the application public key certificate return request information; and a public key certificate response information sending unit 90, configured to send the application public key certificate response information to the transaction terminal.

Figure 24:
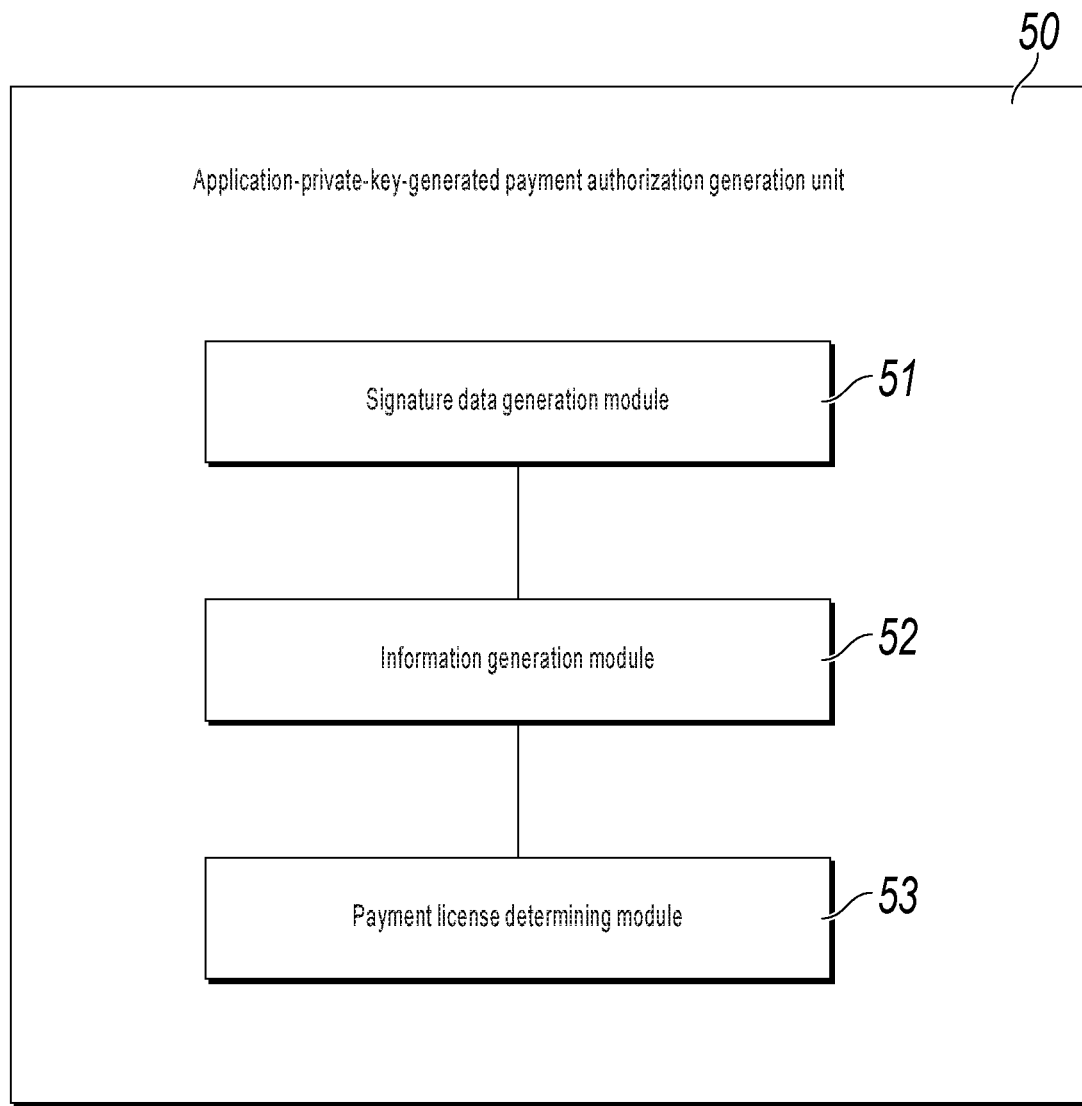
FIG. 24 is a schematic diagram illustrating an application-private-key-generated payment license generation unit in FIG. 22.

In another implementation of the present disclosure, based on FIG. 22, as shown in FIG. 24, the application-private-key-generated payment authorization generation unit 50 includes: a signature data generation module 51, configured to generate signature data based on the deduction accept request information by using an application private key stored in the mobile terminal; an information generation module 52, configured to generate a TAC based on the deduction accept request information and the transaction response information by using a TAC sub-key that is pre-generated on the mobile terminal; and a payment authorization determining module 53, configured to use the signature data and the TAC as the payment authorization.

Figure 25:
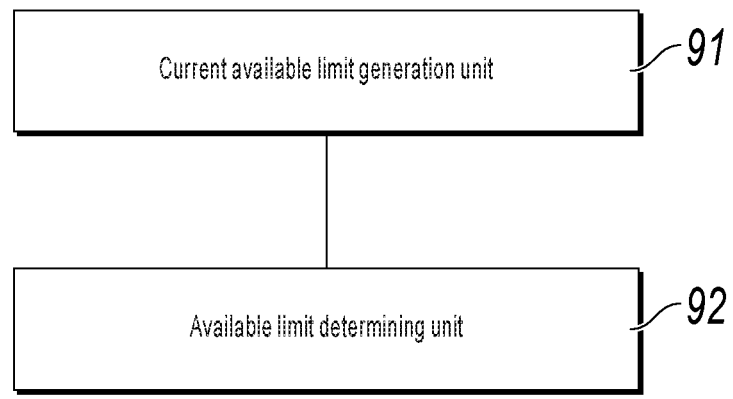
FIG. 25 is a schematic diagram illustrating a credit payment apparatus based on mobile terminal P2P, according to yet another example implementation.

In another implementation of the present disclosure, based on FIG. 22, as shown in FIG. 25, the apparatus further includes: a current available limit generation unit 91, configured to subtract the deduction amount from the available limit in the transaction information based on the deduction amount in the deduction accept request information, to obtain a current available limit; and an available limit determining unit 92, configured to use the current available limit as an available limit that corresponds to a user in the mobile terminal.

Figure 26:
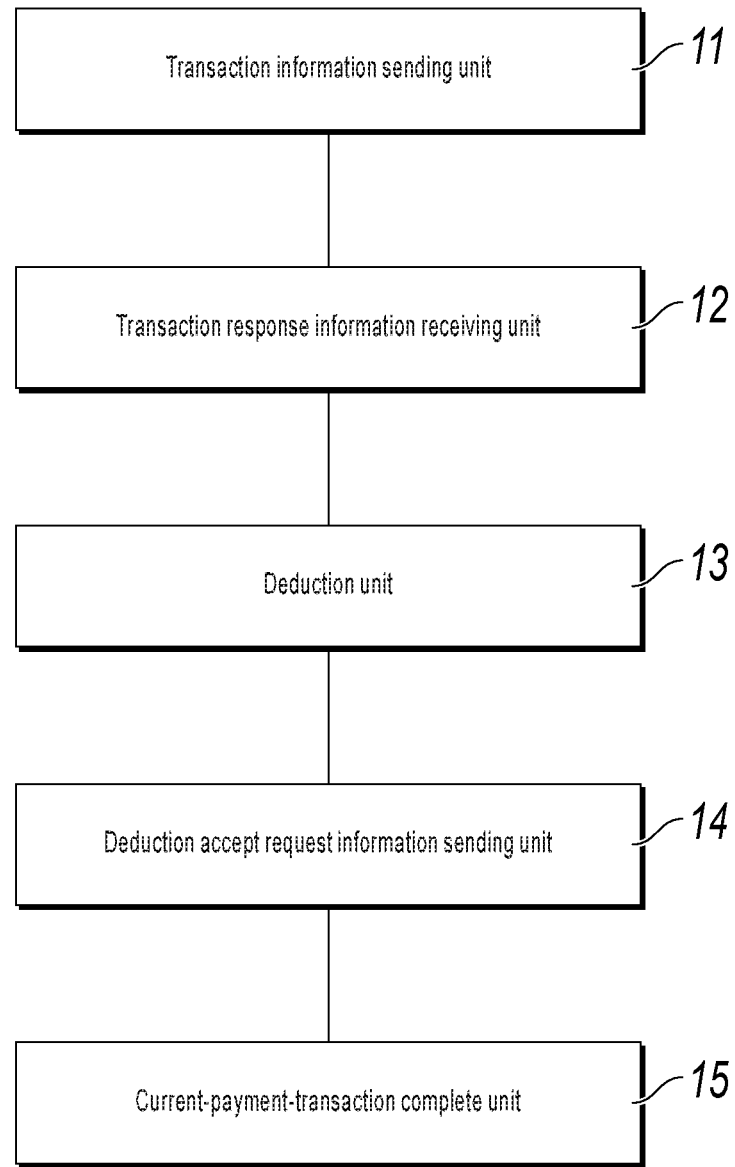
FIG. 26 is a schematic diagram illustrating a credit payment apparatus based on mobile terminal P2P, according to yet another example implementation.

An implementation of the present disclosure further provides a credit payment apparatus based on mobile terminal P2P. The apparatus is located in a transaction terminal. As shown in FIG. 26, the apparatus includes a transaction information sending unit 11, a transaction response information receiving unit 12, a deduction unit 13, a deduction accept request information sending unit 14, and a current-payment-transaction complete unit 15.

The transaction information sending unit 11 is configured to send transaction information to a mobile terminal.

The transaction response information receiving unit 12 is configured to receive transaction response information sent by the mobile terminal.

The deduction unit 13 is configured to generate deduction accept request information of the current payment transaction deduction based on the transaction response information.

The deduction accept request information sending unit 14 is configured to send the deduction accept request information to the mobile terminal.

The Current-payment-transaction completion unit 15 is configured to: when a payment authorization license is received, determine, based on the payment authorization license, that the current payment transaction is completed.

Figure 27:
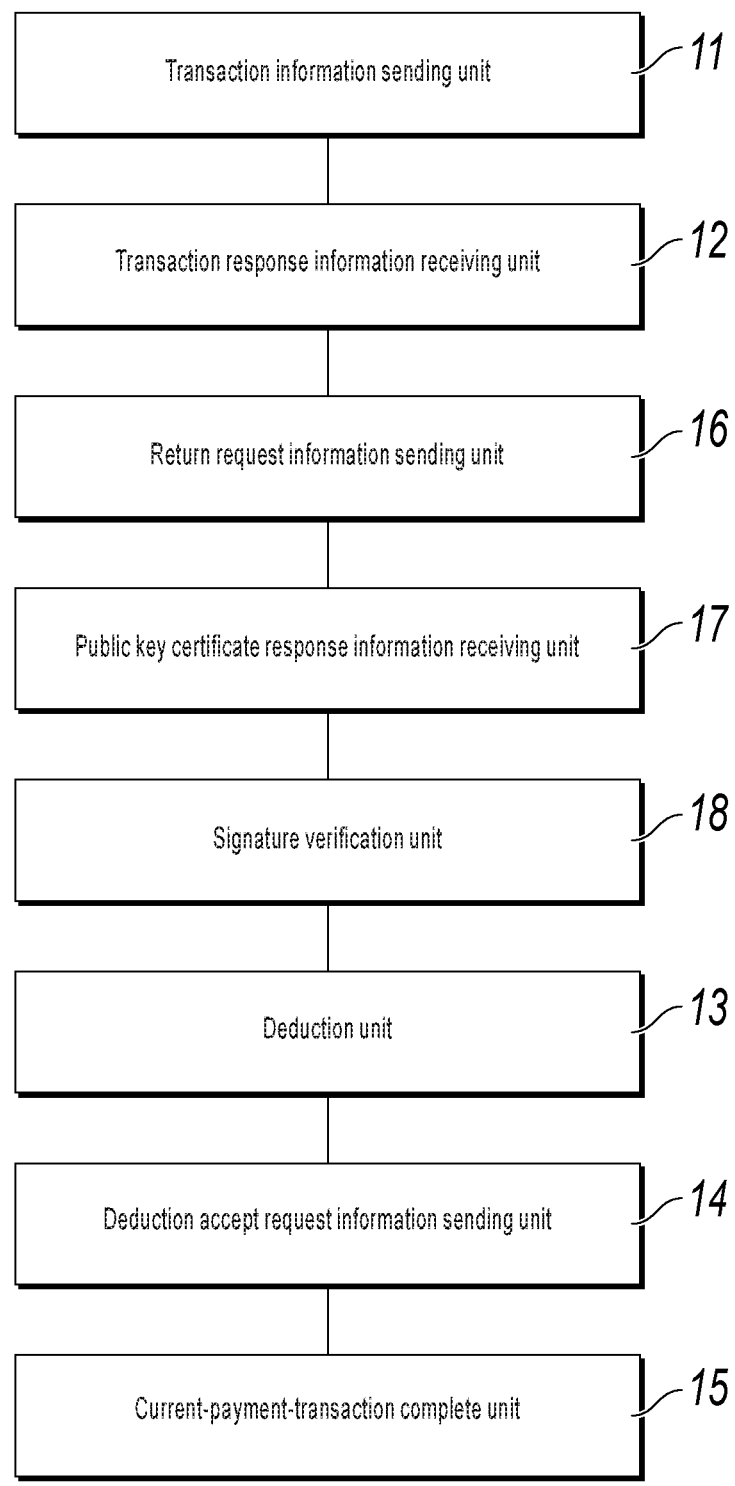
FIG. 27 is a schematic diagram illustrating a credit payment apparatus based on mobile terminal P2P, according to yet another example implementation.

In another implementation of the present disclosure, based on FIG. 26, as shown in FIG. 27, the apparatus further includes: a return request information sending unit 16, configured to send application public key certificate return request information to the mobile terminal; a public key certificate response information receiving unit 17, configured to receive application public key certificate response information sent by the mobile terminal; and a signature verification unit 18, configured to verify a signature on an application public key certificate in the application public key certificate response information by using a credit-licensed public key in the transaction terminal.

Figure 28:
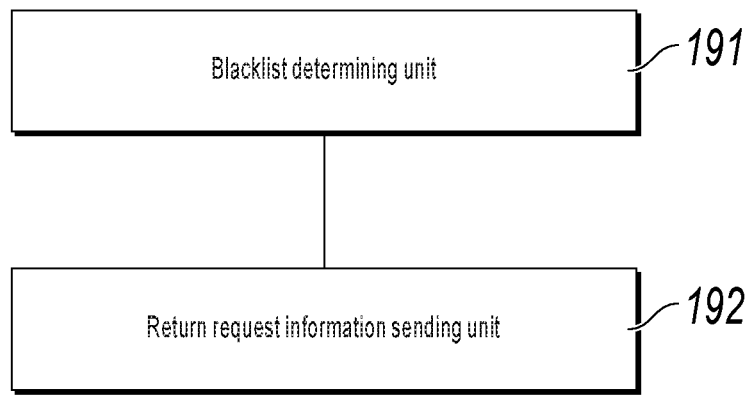
FIG. 28 is a schematic diagram illustrating a credit payment apparatus based on mobile terminal P2P, according to yet another example implementation.

In another implementation of the present disclosure, based on FIG. 26, as shown in FIG. 28, the apparatus further includes a blacklist determining unit 191.

The blacklist determining unit 191 is configured to determine whether the payment card number in the transaction response information is included in a predetermined blacklist.

The return request information sending unit 192 is further configured to: when the payment card number in the transaction response information is not included in the predetermined blacklist, send the application public key certificate return request information to the mobile terminal.

Figure 29:
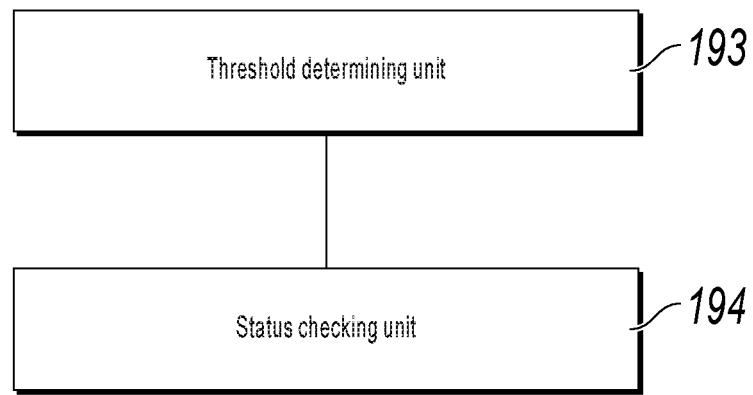
FIG. 29 is a schematic diagram illustrating a credit payment apparatus based on mobile terminal P2P, according to yet another example implementation.

In another implementation of the present disclosure, based on FIG. 21, as shown in FIG. 29, the apparatus further includes: a threshold determining unit 193, configured to determine whether the available limit in the transaction response information is greater than or equal to a predetermined threshold; and a status checking unit 194, configured to: if the available limit is greater than or equal to the predetermined threshold, check whether the entry/exit flag in the transaction response information is an exited state.

Figure 30:
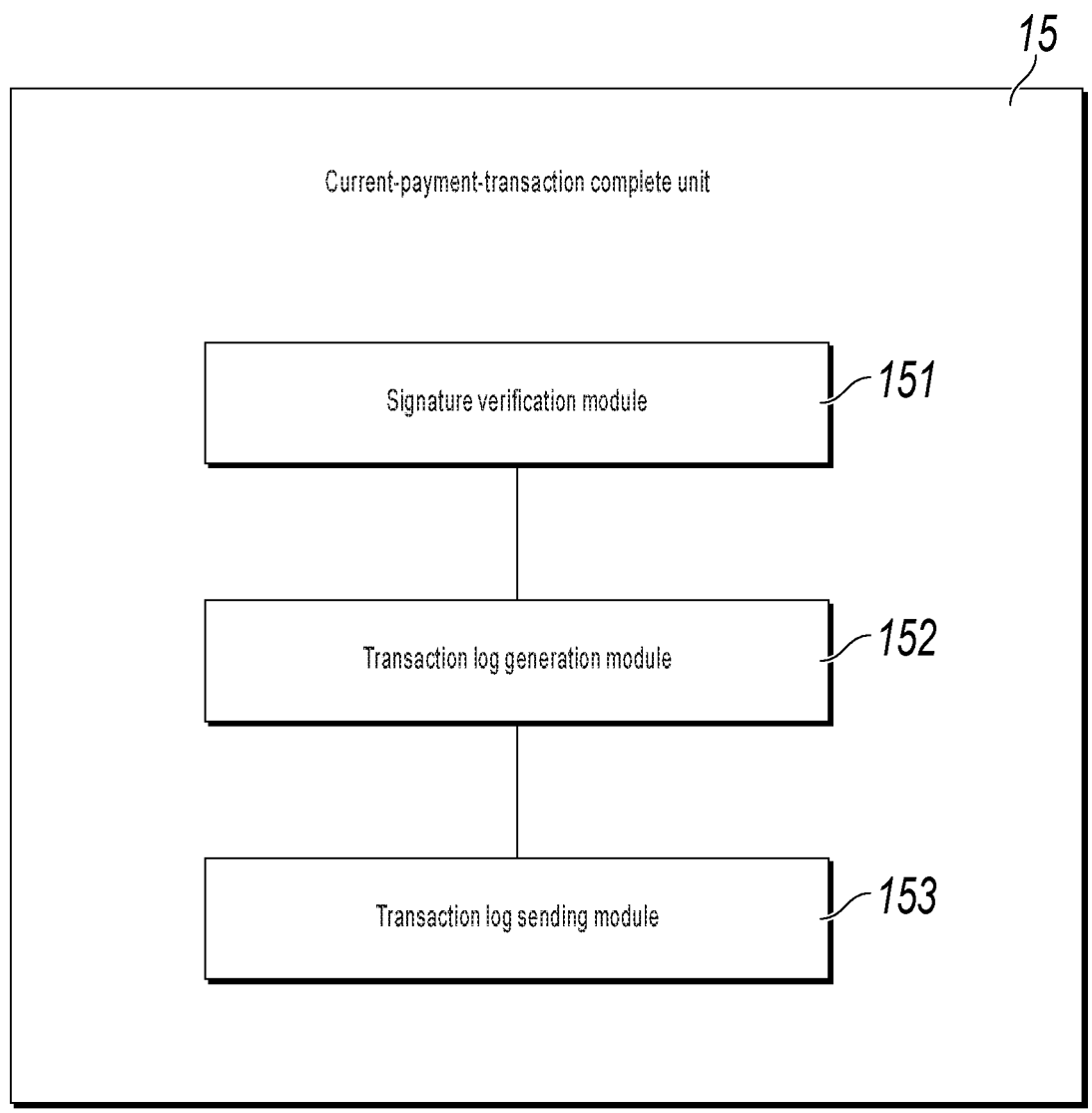
FIG. 30 is a schematic diagram illustrating a current-payment-transaction complete unit in FIG. 26.

In still another implementation of the present disclosure, based on FIG. 26, as shown in FIG. 30, the payment authorization license includes signature data and a TAC, and the current-payment-transaction completion unit 15 includes: a signature verification module 151, configured to verify signature data using the application public key; a transaction log generation module 152, configured to generate a transaction log when the signature data is verified; and a transaction log sending module 153, configured to send the transaction log to a predetermined server, so that the predetermined server deducts, based on the transaction log, a corresponding amount of fund from a user account that corresponds to the mobile terminal, where the transaction log includes the deduction amount, a transaction date, a transaction moment, a transaction terminal ID, a payment card number, an available limit, and the TAC.

With regard to the apparatus implementations, the specific manner each module operates has been described in detail in corresponding method implementations, and details are not repeated here for simplicity.

It can be understood that the present disclosure can be applied to many general-purpose or special purpose computer system environments or configurations. For example, a personal computer, a server computer, a handheld device or a portable device, a flat panel device, a multi-processor system, a microprocessor-based system, a set-top box, a programmable consumption electronic device, a network PC, a minicomputer, a mainframe computer, and a distributed computing environment including any one of the previous systems or devices.

The present disclosure can be described in the general context of instructions executed by a computer, for example, a program module. Generally, the program module includes a routine, a program, an object, a component, a data structure, etc. for executing a particular task or implementing a particular abstract data type. The present disclosure can also be practiced in distributed computing environments. In the distributed computing environments, tasks are executed by remote processing devices that are connected through a communications network. In a distributed computing environment, the program module can be located in both local and remote computer storage media including storage devices.

It is worthwhile to note that in the specification, relational terms such as "first" and "second" are only used to distinguish one entity or operation from another, and do not necessarily require or imply that any actual relationship or sequence exists between these entities or operations. In addition, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such process, method, article, or device. An element described by "includes a . . . " further includes, without more constraints, another identical element in the process, method, article, or device that includes the element.

A person skilled in the art can easily figure out other implementation solutions of the present disclosure after considering the specification and practicing the present disclosure that is disclosed here. The present application is intended to cover any variation, function, or adaptive change of the present disclosure. These variations, functions, or adaptive changes comply with general principles of the present disclosure, and include common knowledge or a commonly used technical means in the technical field that is not disclosed in the present disclosure. The specification and the implementations are merely considered as examples, and the actual scope and the spirit of the present disclosure are pointed out by the following claims.

It should be understood that the present disclosure is not limited to the accurate structures that are described above and that are shown in the accompanying drawings, and modifications and changes can be made without departing from the scope of the present disclosure. The scope of the present disclosure is limited only by the appended claims.

Figure 31:
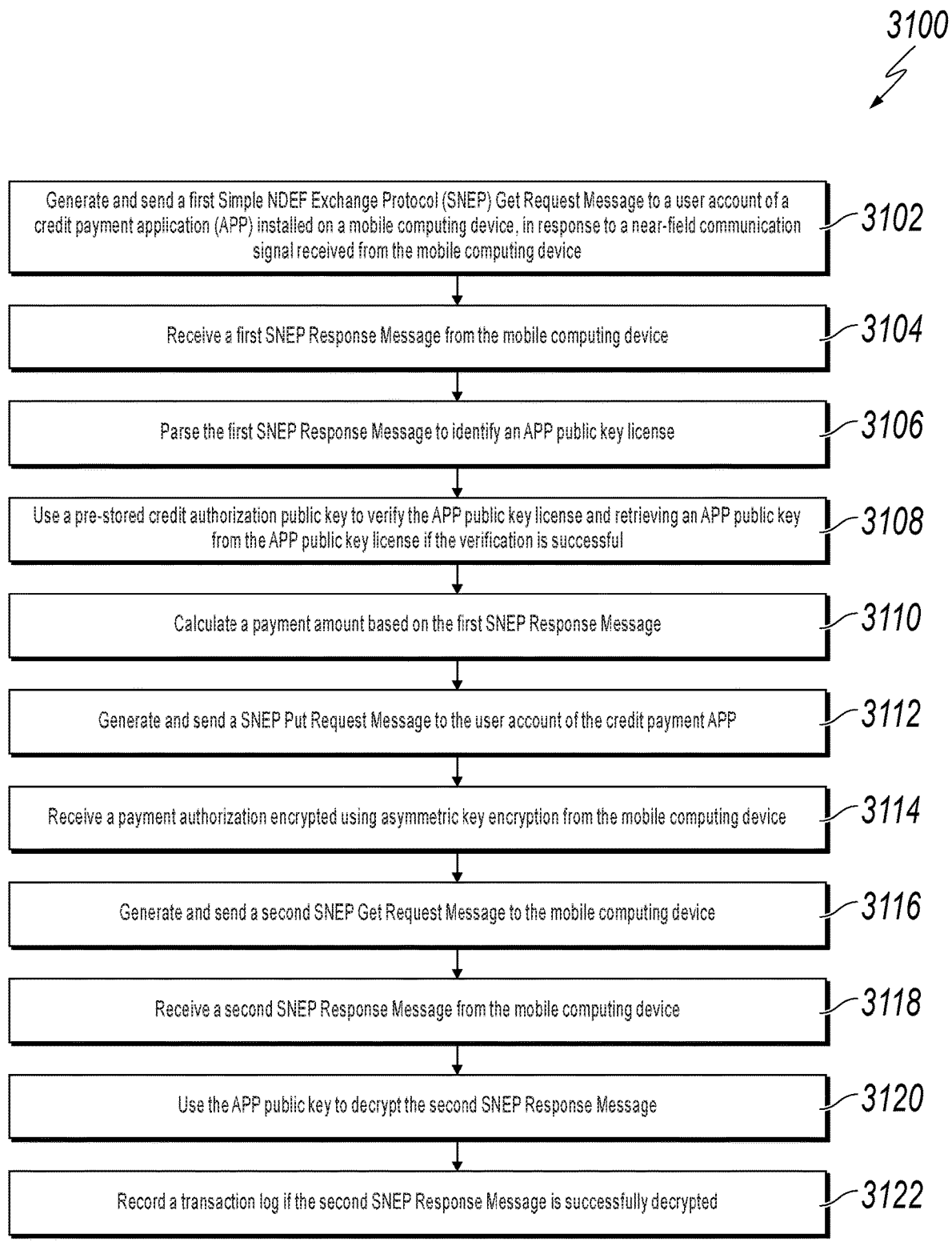
FIG. 31 is a flowchart illustrating an example of a method for collecting mobile credit payment using a payment collection device, according to an implementation of the present disclosure.

FIG. 31 is a flowchart illustrating an example of a method 3100 for collecting mobile credit payment using a payment collection device, according to an implementation of the present disclosure. For clarity of presentation, the description that follows generally describes method 3100 in the context of the other figures in this description. However, it will be understood that method 3100 can be performed, for example, by any system, environment, software, and hardware, or a combination of systems, environments, software, and hardware, as appropriate. In some implementations, various steps of method 3100 can be run in parallel, in combination, in loops, or in any order. In some implementations, method 3100 can be performed by a payment registration or collection device such as a gate scanner device, at a public transportation station.

At 3102, a first SNEP Get Request Message is generated and sent to a user account of a credit payment application (APP) installed on a mobile computing device, in response to a NFC signal received from the mobile computing device. In some implementations, the SNEP Get Request Message can include an information field indicating that the SNEP Request Message is a card information reading message for reading an APP public key license. From 3102, method 3100 proceeds to 3104.

At 3104, a first SNEP Response Message is received from the mobile computing device. In some implementations, the first SNEP Response Message can include at least one of a payment card number, an available balance, a station entrance/exit flag, or last transaction information. The station entrance/exit flag can indicate an entrance or exit status of a station and the last transaction information can include transaction date, transaction time, and station information. In some implementations, the first SNEP Response Message is rejected if the card number is blacklisted, the available balance is less than a transaction amount, or the station entrance/exit flag does not match the mobile computing device's entrance or exit status. In some cases, the operations can be performed sequentially. For example, a gate scanner device can first determine if the card number is blacklisted. If not, the gate scanner device can determine whether the available balance is less than the transaction amount. If not, the gate scanner device can determine whether the station entrance/exit flag matches the mobile computing device's entrance or exit status. In some implementations, the station entrance/exit flag can have binary values. For example, value "1" can indicate that a user has entered into a public transportation station, while value "0" can indicate that the user has exited the public transportation station. As such, a user can be rejected from entering a station if the entrance/exit flag is "1," or rejected from exiting a station if the entrance/exit flag is "0". From 3104, method 3100 proceeds to 3106.

At 3106, the first SNEP Response Message is parsed to identify an APP public key license. From 3106, method 3100 proceeds to 3108.

At 3108, a pre-stored credit authorization public key is used to verify the APP public key license and an APP public key is retrieved from the APP public key license if the verification is successful. Otherwise, the transaction can be rejected by the gate scanner device. From 3108, method 3100 proceeds to 3110.

At 3110, a payment amount is calculated based on the first SNEP Response Message. From 3110, method 3100 proceeds to 3112.

At 3112, a SNEP Put Request Message is generated and sent to the user account of the credit payment APP. The SNEP Put Request Message can include an information field indicating at least one of a payment amount, transaction date and time, a station entrance/exit flag, or station information of a current transaction. After receiving the SNEP Put Request Message, the credit payment APP can use an APP private key to digitally sign at least one of the payment amount, transaction date and time, and station information of the current transaction to generate digitally signed data. The credit payment APP can also use TAC sub-key to digitally sign at least one of the payment amount, transaction date and time, payment card number, credit limit, or available balance information to generate a TAC. The digitally signed data and the TAC can form a payment authorization. In some implementations, the credit payment APP can make corresponding changes to the entrance/exit flag, available balance, deduct the payment amount, store the station information of the current transaction and the transaction date and time, or store the digitally signed data and TAC. From 3112, method 3100 proceeds to 3114.

At 3114, a payment authorization encrypted using asymmetric key encryption is received from the mobile computing device. From 3114, method 3100 proceeds to 3116.

At 3116, a second SNEP Get Request Message is generated and sent to the mobile computing device. From 3116, method 3100 proceeds to 3118.

At 3118, a second SNEP Response Message is received from the mobile computing device. The second SNEP Response Message includes payment information encrypted by an APP private key and a TAC, and wherein the private key is stored in an embedded secure element (eSE) of the mobile computing device and the TAC is generated based on at least part of the payment information by using a TAC sub-key that is pre-generated and stored on the eSE. The payment information can include the payment amount and at least one of a payment amount, transaction date and time, a station entrance/exit flag, station information of a current transaction, a payment card number, or a credit limit. From 3118, method 3100 proceeds to 3120.

At 3120, the APP public key is used to decrypt the second SNEP Response Message. From 3120, method 3100 proceeds to 3122.

At 3122, a transaction log is recorded if the second SNEP Response Message is successfully decrypted. In some implementations, the transaction log is sent to a credit payment authorization server to decrypt the TAC. The payment can then be received from the credit payment authorization server according to the payment amount if the TAC is successfully decrypted. As such, the payment registration or collection device does not need to be connected to the credit payment authorization server all the time. It can perform payment registration to generate the transaction log offline. A plurality of payments can be executed at once when the payment registration or collection device is connected to the credit payment server.

To enhance safety, in some implementations, when the mobile payments made by using method 3100 surpass a predetermined number of payments, a predetermined amount, or a predetermined time interval, the mobile computing device that makes the payments may be required to go online for identity verification. After the mobile computing device passes the verification, a data update notification can be sent to the credit payment APP to reauthorize making credit payment reset relevant data such as the number of payments and payment amount. After 3122, method 3100 stops.

Implementations of the subject matter described in this specification can be implemented so as to realize particular advantages or technical effects. For example, implementations of the subject matter permit a public transportation payment collection device to securely accept payment offline. The payment collection device receives a payment request, requesting a public key certificate from the mobile computing device to retrieve a public key, and use the retrieved public key to verify a payment authorization encrypted by the mobile computing device. A transaction can be recorded if the payment authorization is successfully verified. The transaction log can be sent to a credit payment authorization server to execute the payment. Since the transaction log can be recorded offline, the payment collection or registration device at the public transportation station only need to connect to the credit payment authorization server periodically to execute a plurality of payments together. As such, mobile payments of public transportation can be more efficiently and securely performed.

The described methodology permits enhancement of transaction/data security of various mobile computing device and payment collection device. Participants in transactions using eSE embedded in mobile computing devices and payment collection device such as a public transportation gate scanner can be confident that short-range communications such as NFC and security measures including asymmetric key encryption can ensure secured offline credit payment.

Asymmetric key encryption can be used to enhance data security. A public key is stored in the eSE of mobile computing devices instead of public transportation payment collection device and can be retrieved only by request. A private key can be used to provide digital signature to payment information and generate TAC to further enhance payment security.

The described methodology can ensure the efficient usage of computer resources (for example, processing cycles, network bandwidth, and memory usage), through the efficient offline payment processing. At least these actions can minimize or prevent waste of available computer and network resources with respect to multiple parties in mobile transactions by reducing bandwidth occupancy between the payment collection device, the mobile computing device, and the server. Instead of the payment collection device needing to verify data with additional communication or transactions with the server in real-time, transactions can be depended upon as valid when the payment collection device is offline to avoid delays cost by network delays. The payment can be more quickly and securely recorded to improve user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD)

or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving a near-field communication (NFC) signal from a mobile computing device, wherein an offline credit payment function of the mobile computing device is enabled by a credit payment authorization server;
    in response to receiving the NFC signal from the mobile computing device, generating and sending a first Simple NDEF Exchange Protocol (SNEP) Get Request Message to a user account of a credit payment application (APP) installed on the mobile computing device;
    receiving a first SNEP Response Message from the mobile computing device;
    parsing the first SNEP Response Message to identify an APP public key license;
    using a pre-stored credit authorization public key to verify the APP public key license;
    determining that the verification of the APP public key license is successful;
    in response to determining that the verification is successful, retrieving an APP public key from the APP public key license;
    calculating a payment amount based on the first SNEP Response Message;
    generating and sending a SNEP Put Request Message to the user account of the credit payment APP;
    receiving a payment authorization encrypted using asymmetric key encryption from the mobile computing device;
    generating and sending a second SNEP Get Request Message to the mobile computing device;
    receiving a second SNEP Response Message from the mobile computing device, wherein the second SNEP Response Message includes payment information encrypted by an APP private key and a transaction authentication code (TAC), wherein the payment information includes the payment amount, transaction date and time, a payment card number, and a credit limit, and wherein the credit limit is an available amount authorized by the credit payment authorization server and usable in an offline mode;
    using the APP public key to decrypt the second SNEP Response Message; and
    in response to determining that the second SNEP Response Message is successfully decrypted, accepting the payment amount offline and recording a transaction log offline.

2. The computer-implemented method of claim 1, wherein the SNEP Get Request Message includes an information field indicating that the SNEP Request Message is a card information reading message for reading the APP public key license, the first SNEP Response Message includes at least one of a payment card number, an available balance, a station entrance/exit flag, or last transaction information, and wherein the station entrance/exit flag indicates an entrance or exit status of a station and the last transaction information includes transaction date, transaction time, and station information.

3. The computer-implemented method of claim 2, further comprising rejecting the first SNEP Response Message if the card number is blacklisted, and the available balance is less than a transaction amount, or the station entrance/exit flag does not match the mobile computing device's entrance or exit status.

4. The computer-implemented method of claim 1, wherein the SNEP Put Request Message includes an information field indicating at least one of the payment amount, transaction date and time, a station entrance/exit flag, or station information of a current transaction.

5. The computer-implemented method of claim 1, wherein the APP private key is stored in an embedded secure element (eSE) of the mobile computing device and the TAC is generated based on at least part of the payment information by using a TAC sub-key that is pre-generated and stored on the eSE.

6. The computer-implemented method of claim 5, wherein the payment information includes at least one of a station entrance/exit flag or station information of a current transaction.

7. The computer-implemented method of claim 5, further comprising:
sending the transaction log to the credit payment authorization server to decrypt the TAC; and
receiving a payment from the credit payment authorization server according to the payment amount if the TAC is successfully decrypted.

8. A non-transitory, computer-readable medium storing one or more instructions executable by a computer system to perform operations comprising:
receiving a near-field communication (NFC) signal from a mobile computing device, wherein an offline credit payment function of the mobile computing device is enabled by a credit payment authorization server;
in response to receiving the NFC signal from the mobile computing device, generating and sending a first Simple NDEF Exchange Protocol (SNEP) Get Request Message to a user account of a credit payment application (APP) installed on the mobile computing device;
receiving a first SNEP Response Message from the mobile computing device;
parsing the first SNEP Response Message to identify an APP public key license;
using a pre-stored credit authorization public key to verify the APP public key license;
determining that the verification of the APP public key license is successful;
in response to determining that the verification is successful, retrieving an APP public key from the APP public key license;
calculating a payment amount based on the first SNEP Response Message;
generating and sending a SNEP Put Request Message to the user account of the credit payment APP;
receiving a payment authorization encrypted using asymmetric key encryption from the mobile computing device;
generating and sending a second SNEP Get Request Message to the mobile computing device;
receiving a second SNEP Response Message from the mobile computing device, wherein the second SNEP Response Message includes payment information encrypted by an APP private key and a transaction authentication code (TAC), wherein the payment information includes the payment amount, transaction date and time, a payment card number, and a credit limit, and wherein the credit limit is an available amount authorized by the credit payment authorization server and usable in an offline mode;
using the APP public key to decrypt the second SNEP Response Message; and
in response to determining that the second SNEP Response Message is successfully decrypted, accepting the payment amount offline and recording a transaction log offline.

9. The non-transitory, computer-readable medium of claim 8, wherein the SNEP Get Request Message includes an information field indicating that the SNEP Request Message is a card information reading message for reading the APP public key license, the first SNEP Response Message includes at least one of a payment card number, an available balance, a station entrance/exit flag, or last transaction information, and wherein the station entrance/exit flag indicates an entrance or exit status of a station and the last transaction information includes transaction date, transaction time, and station information.

10. The non-transitory, computer-readable medium of claim 9, further comprising rejecting the first SNEP Response Message if the card number is blacklisted, and the available balance is less than a transaction amount, or the station entrance/exit flag does not match the mobile computing device's entrance or exit status.

11. The non-transitory, computer-readable medium of claim 8, wherein the SNEP Put Request Message includes an information field indicating at least one of the payment amount, transaction date and time, a station entrance/exit flag, or station information of a current transaction.

12. The non-transitory, computer-readable medium of claim 8, wherein the APP private key is stored in an embedded secure element (eSE) of the mobile computing device and the TAC is generated based on at least part of the payment information by using a TAC sub-key that is pre-generated and stored on the eSE.

13. The non-transitory, computer-readable medium of claim 12, wherein the payment information includes at least one of a station entrance/exit flag or station information of a current transaction.

14. The non-transitory, computer-readable medium of claim 12, further comprising:
sending the transaction log to the credit payment authorization server to decrypt the TAC; and
receiving a payment from the credit payment authorization server according to the payment amount if the TAC is successfully decrypted.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a near-field communication (NFC) signal from a mobile computing device, wherein an offline credit payment function of the mobile computing device is enabled by a credit payment authorization server;
in response to receiving the NFC signal from the mobile computing device, generating and sending a first Simple NDEF Exchange Protocol (SNEP) Get Request Message to a user account of a credit payment application (APP) installed on the mobile computing device;
receiving a first SNEP Response Message from the mobile computing device;
parsing the first SNEP Response Message to identify an APP public key license;
using a pre-stored credit authorization public key to verify the APP public key license;
determining that the verification of the APP public key license is successful;
in response to determining that the verification is successful, retrieving an APP public key from the APP public key license;
calculating a payment amount based on the first SNEP Response Message;
generating and sending a SNEP Put Request Message to the user account of the credit payment APP;

receiving a payment authorization encrypted using asymmetric key encryption from the mobile computing device;

generating and sending a second SNEP Get Request Message to the mobile computing device;

receiving a second SNEP Response Message from the mobile computing device, wherein the second SNEP Response Message includes payment information encrypted by an APP private key and a transaction authentication code (TAC), wherein the payment information includes the payment amount, transaction date and time, a payment card number, and a credit limit, and wherein the credit limit is an available amount authorized by the credit payment authorization server and usable in an offline mode;

using the APP public key to decrypt the second SNEP Response Message; and in response to determining that the second SNEP Response Message is successfully decrypted, accepting the payment amount offline and recording a transaction log offline.

16. The computer-implemented system of claim 15, wherein the SNEP Get Request Message includes an information field indicating that the SNEP Request Message is a card information reading message for reading the APP public key license, the first SNEP Response Message includes at least one of a payment card number, an available balance, a station entrance/exit flag, or last transaction information, and wherein the station entrance/exit flag indicates an entrance or exit status of a station and the last transaction information includes transaction date, transaction time, and station information.

17. The computer-implemented system of claim 16, further comprising rejecting the first SNEP Response Message if the card number is blacklisted, and the available balance is less than a transaction amount, or the station entrance/exit flag does not match the mobile computing device's entrance or exit status.

18. The computer-implemented system of claim 15, wherein the SNEP Put Request Message includes an information field indicating at least one of the payment amount, transaction date and time, a station entrance/exit flag, or station information of a current transaction.

19. The computer-implemented system of claim 15, wherein the APP private key is stored in an embedded secure element (eSE) of the mobile computing device and the TAC is generated based on at least part of the payment information by using a TAC sub-key that is pre-generated and stored on the eSE.

20. The computer-implemented system of claim 19, wherein the payment information includes at least one of a station entrance/exit flag or station information of a current transaction.

* * * * *